United States Patent
Umemoto et al.

(10) Patent No.: US 7,421,191 B2
(45) Date of Patent: Sep. 2, 2008

(54) MONITOR CONNECTION DESTINATION SETTER CONNECTION DESTINATION SETTING METHOD AND CONNECTION DESTINATION SETTING PROGRAM

(75) Inventors: Seiichiro Umemoto, Kyoto (JP); Takashi Toyota, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1028 days.

(21) Appl. No.: 10/250,672

(22) PCT Filed: Jan. 15, 2002

(86) PCT No.: PCT/JP02/00205

§ 371 (c)(1), (2), (4) Date: Jul. 15, 2003

(87) PCT Pub. No.: WO02/058065

PCT Pub. Date: Jul. 25, 2002

(65) Prior Publication Data

US 2004/0062519 A1 Apr. 1, 2004

(30) Foreign Application Priority Data

Jan. 10, 2002 (JP) ............................. 2002-003443
Jan. 17, 2002 (JP) ............................. 2001-008486

(51) Int. Cl.
  *H04N 5/91* (2006.01)
(52) U.S. Cl. .................. 386/123; 386/124; 386/97; 386/46; 386/113; 348/558
(58) Field of Classification Search ......... 386/123–124, 386/97, 46, 113
See application file for complete search history.

(56) References Cited

U.S. PATENT DOCUMENTS

| 6,453,364 | B1 * | 9/2002 | Hara .......................... 710/16 |
| 7,047,325 | B2 * | 5/2006 | Kondo et al. .................. 710/16 |
| 7,224,402 | B2 * | 5/2007 | Cho ........................... 348/558 |

FOREIGN PATENT DOCUMENTS

| EP | 0892406 | 1/1999 |
| EP | 0920201 | 6/1999 |
| EP | 0975161 | 1/2000 |
| JP | 10-313443 | 11/1998 |
| JP | 11-39847 | 2/1999 |
| JP | 2000-115676 | 4/2000 |
| JP | 2000-187932 | 7/2000 |

OTHER PUBLICATIONS

English Language Abstract of JP 2000-187932.

* cited by examiner

*Primary Examiner*—Thai Tran
*Assistant Examiner*—Helen Shibru
(74) *Attorney, Agent, or Firm*—Greenblum & Bernstein, P.L.C.

(57) ABSTRACT

An input check device generates a connected apparatus table showing the correspondence between recording/reproducing devices and their respective output signals on the basis of instruction signals entered from a connection information setting unit. A storage stores information as to which is the current target of reproduction among the recording/reproducing devices connected to the monitor device and also stores the connected apparatus table generated by the input check device.

16 Claims, 13 Drawing Sheets

Fig. 6

(TABLE OF CONNECTED APPARATUSES)

| CONNECTED APPARATUS INFORMATION | ANALOG TERMINAL | DIGITAL SIGNAL |
|---|---|---|
| R1 | AP1 | DD1 |
| R2 | AP2 | DD2 |
| BLANK | BLANK | BLANK |
| BLANK | BLANK | BLANK |
| BLANK | BLANK | BLANK |

Fig. 7

(SCREEN FOR SETTING APPARATUS CONNECTION)

| VIDEO 1 | VIDEO 1 |
|---|---|
| VIDEO 2 | VIDEO 2 |
| VIDEO 3 | VIDEO 3 |
| COLOR-DIFFERENCE VIDEO 1 | COLOR-DIFFERENCE VIDEO 1 |
| COLOR-DIFFERENCE VIDEO 2 | COLOR-DIFFERENCE VIDEO 2 |

Fig. 8

(SELECT CONNECTED APPARATUS TO BE SET)

| VIDEO 1 | VIDEO 1 |
|---|---|
| VIDEO 2 | VIDEO 2 |
| VIDEO 3 | VIDEO 3 |
| COLOR-DIFFERENCE VIDEO 1 | COLOR-DIFFERENCE VIDEO 1 |
| COLOR-DIFFERENCE VIDEO 2 | COLOR-DIFFERENCE VIDEO 2 |

Fig. 9

(ASSOCIATE CONNECTED APPARATUS AND SIGNAL)

| VIDEO 1 | D-VHS 1 |
|---|---|
| VIDEO 2 | VIDEO 2 |
| VIDEO 3 | VIDEO 3 |
| COLOR-DIFFERENCE VIDEO 1 | COLOR-DIFFERENCE VIDEO 1 |
| COLOR-DIFFERENCE VIDEO 2 | COLOR-DIFFERENCE VIDEO 2 |

Fig. 10

(ASSOCIATE CONNECTED APPARATUS AND SIGNAL)

| VIDEO 1 | D-VHS 1 |
|---|---|
| VIDEO 2 | D-VHS 2 |
| VIDEO 3 | VIDEO 3 |
| COLOR-DIFFERENCE VIDEO 1 | COLOR-DIFFERENCE VIDEO 1 |
| COLOR-DIFFERENCE VIDEO 2 | COLOR-DIFFERENCE VIDEO 2 |

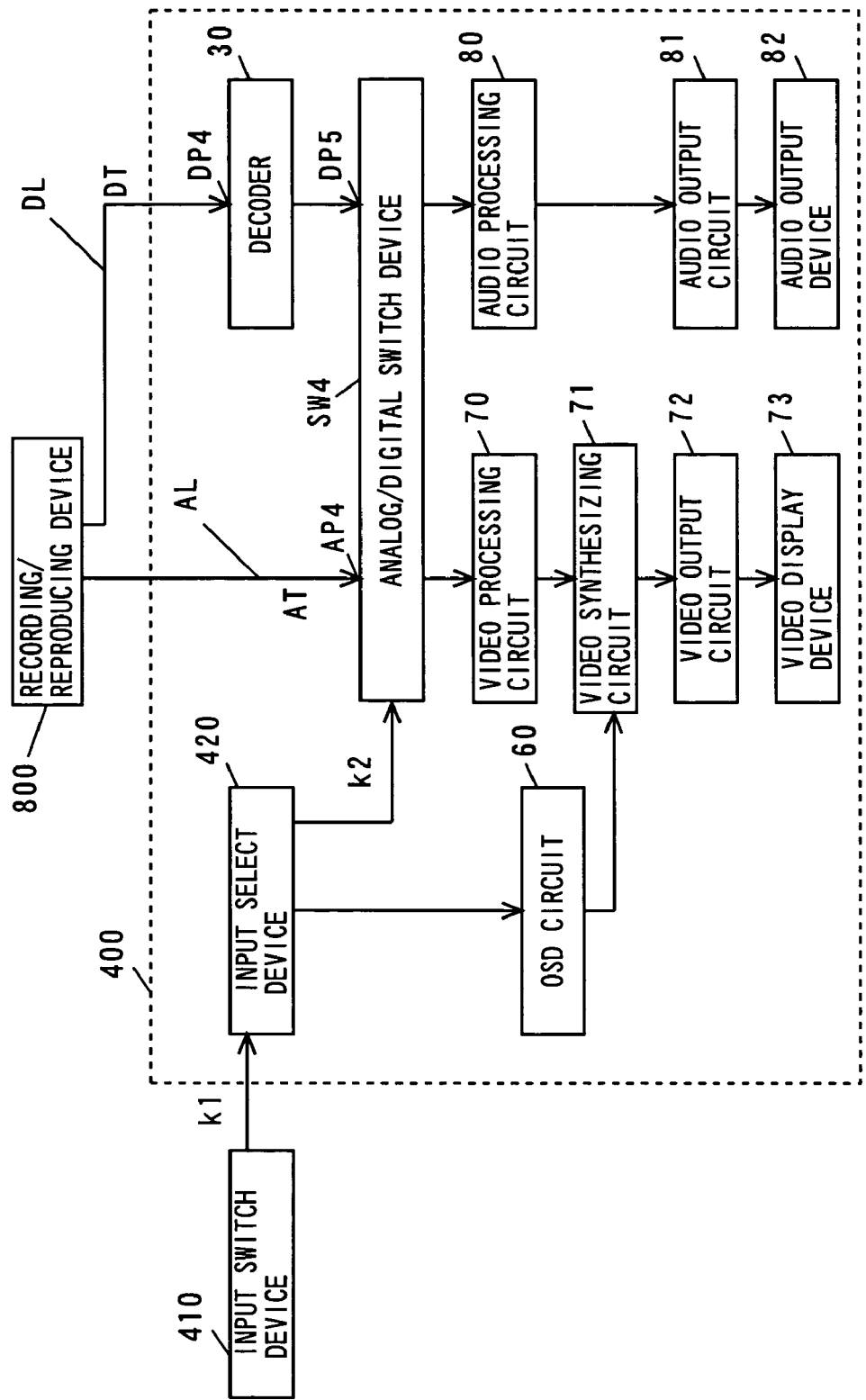

MONITOR CONNECTION DESTINATION SETTER CONNECTION DESTINATION SETTING METHOD AND CONNECTION DESTINATION SETTING PROGRAM

TECHNICAL FIELD

The present invention relates to a monitor device to which one or a plurality of apparatuses can be connected, and to a connection information setting device, a connection information setting method, and a connection information setting program.

BACKGROUND ART

The recent developments of various formats of video signals and audio signals are stimulating the development of recording media, recording/reproducing devices, and monitor devices that can handle a plurality of signal formats. Such signals typically include analog and digital signals.

For example, as for the recording media, the D-VHS (DATA-Video Home System: a registered trademark of Victor Company of Japan, Limited) has been developed as a videotape capable of recording and reproducing both digital and analog signals. As for the recording/reproducing devices, videocassette recorders capable of recording and reproducing both digital and analog signals are developed for use with the D-VHS tape.

FIG. 17 is a schematic diagram showing videotape on which a digital signal and an analog signal are recorded.

In FIG. 17, a digital signal DT and an analog signal AT are alternately recorded on the videotape 700. The videotape 700 is reproduced in such a videocassette recorder as mentioned above and the reproduced signal is outputted in accordance with the signal formats recorded on the videotape.

In the field of monitor devices, too, television receivers etc. are developed for use with the videotape and videocassette recorders mentioned above.

FIG. 18 is a block diagram showing the structure of a monitor device that can process digital and analog signals.

In FIG. 18, the monitor device 400 is connected with a recording/reproducing device 800 through two cables AL and DL.

The cable AL transfers an analog signal AT outputted from the recording/reproducing device 800. The cable DL transfers a digital signal DT outputted from the recording/reproducing device 800.

The recording/reproducing device 800 is, for example, a videocassette recorder that has a function of recording/reproducing both digital and analog signals as mentioned above. When the recording/reproducing device 800 is a videocassette recorder, the recording/reproducing device 800 records the signal input from the monitor device 400 on videotape or outputs the information recorded on videotape to the monitor device 400 as a reproduction signal.

An input switch device 410, typically a remote controller, instructs the monitor device 400 to perform given operations.

The monitor device 400 includes a decoder 30, an input select device 420, an analog/digital switch device SW4, an OSD (On Screen Display) circuit 60, a video processing circuit 70, a video synthesizing circuit 71, a video output circuit 72, a video display device 73, an audio processing circuit 80, an audio output circuit 81, and an audio output device 82.

The decoder 30 has a digital terminal DP4. The reproduction signal that is sent from the recording/reproducing device 800 through the cable DL to the digital terminal DP4 is a digital signal. The decoder 30 decodes the digital signal from the digital terminal DP4 and outputs the decoded analog signal to the analog/digital switch device SW4.

The input select device 420, formed of a microcomputer, selects the signal format to be reproduced on the basis of an instruction signal from the input switch device 410, and instructs the analog/digital switch device SW4 to provide for video display and audio output in the selected signal format.

The analog/digital switch device SW4 has an analog terminal AP4 and an analog terminal DP5. The reproduction signal inputted to the analog terminal AP4 is an analog signal and the reproduction signal inputted to the analog terminal DP5 is the analog signal decoded in the decoder 30.

On the basis of an instruction from the input select device 420, the analog/digital switch device SW4 selects the analog signal from the analog terminal AP4 or the analog signal from the analog terminal DP5 and outputs it to the video processing circuit 70 and the audio processing circuit 80.

Now, the reproduction signal (the analog signal or digital signal) includes a video signal and an audio signal; the analog/digital switch device SW4 outputs the video signal to the video processing circuit 70 and the audio signal to the audio processing circuit 80.

The OSD circuit 60 outputs a graphic signal to the video synthesizing circuit 71 to superimpose characters etc. on the image displayed on the screen of the video display device 73. The video processing circuit 70 processes in a given manner the video signal from the analog/digital switch device SW4 and outputs the video signal to the video synthesizing circuit 71.

The video synthesizing circuit 71 synthesizes the graphic signal from the OSD circuit 60 and the video signal from the video processing circuit 70 and outputs the synthesized video signal to the video output circuit 72. When the graphic signal from the OSD circuit 60 is absent, only the video signal from the video processing circuit 70 is outputted to the video output circuit 72.

The video output circuit 72 outputs the input video signal to the video display device 73. The video display device 73, including, e.g. a cathode-ray tube, liquid crystal, or plasma display, provides video display on the basis of the input video signal. The video processing circuit 70, video synthesizing circuit 71, video output circuit 72, and video display device 73 form the video display system.

The audio processing circuit 80 processes in a given way the audio signal inputted from the analog/digital switch device SW4 and outputs the audio signal to the audio output circuit 81. The audio output circuit 81 outputs the input audio signal to the audio output device 82. The audio output device 82, including a speaker etc., provides audio output on the basis of the input audio signal. The audio processing circuit 80, audio output circuit 81, and audio output device 82 form the audio output system.

When the recording/reproducing device 800 reproduces information recorded on the above-described videotape 700 in the structure shown in FIG. 18, the monitor device 400 operates as shown below.

It is assumed that the analog signal AT containing video and audio information is recorded in the first part on the videotape 700, followed by the digital signal DT containing video and audio information. It is also assumed that the monitor device 400 is set to output a reproduction signal with the analog signal AT.

First, the analog signal AT outputted from the recording/reproducing device 800 is inputted to the analog/digital switch device SW4 through the cable AL and the analog terminal AP4.

When the monitor device 400 recognizes that it should output a reproduction signal with the analog signal AT, the analog/digital switch device SW4 outputs the analog signal AT received at the analog terminal AP4 to the video display system and the audio output system. Then the analog signal AT outputted to the video display system and the audio output system is displayed as video and outputted as sound.

Next, suppose that during the reproduction of the videotape 700, the video and audio signals recorded on the videotape 700 have switched to the digital signal DT.

At this time, the recording/reproducing device 800 outputs the digital signal DT to the decoder 30 through the cable DL and the digital terminal DP4.

The digital signal DT is decoded in the decoder 30 and sent to the analog/digital switch device SW4 through the analog terminal DP5. However, receiving the analog signal decoded in the decoder 30, the analog/digital switch device SW4 does not output the decoded analog signal received at the analog terminal DP5 to the video display system and the audio output system, because, among the reproduction signal inputs, it is set to output only the analog signal AT received at the analog terminal AP4 to the video processing circuit 70 and the audio processing circuit 80.

Thus, despite the fact that the digital signal DT from the videotape 700 is providing the video signal and audio signal, the monitor device 400 is unable to perform video display and audio output operations on the basis of the digital signal DT.

Thus the information reproduced from the video and audio signals on the videotape 700 is suddenly interrupted and then the viewer of the monitor device 400 cannot obtain the reproduced information. The viewer then recognizes the condition of the monitor device 400 and notices that the video and audio information recorded on the videotape 700 has changed from the analog signal AT to the digital signal DT.

The viewer therefore operates the input switch device 410 to send to the monitor device 400 an instruction signal k1 indicating that the signal to be reproduced currently is the digital signal DT.

The instruction signal k1 is inputted to the input select device 420. Receiving the instruction signal k1, the input select device 420 recognizes that the signal to be reproduced currently is the digital signal DT and outputs an instruction signal k2 to the analog/digital switch device SW4 to cause it to output the analog signal decoded in the decoder 30 and applied to the analog terminal DP5, to the video processing circuit 70 and the audio processing circuit 80. Then the analog/digital switch device SW4 outputs the decoded analog signal to the video display system and the audio output system, and thus the video display and audio output can be made on the basis of the digital signal DT.

According to the monitor device 400 described above, the viewer who desires to obtain the signal information reproduced from the videotape 700 has to know whether the currently outputted reproduced signal is an analog signal or a digital signal. When the reproduction signal from the recording/reproducing device 800 has changed from the analog signal to the digital signal, the viewer has to take the trouble to manually switch the signal from analog to digital.

Recently, a plurality of recording/reproducing devices may be connected to a single monitor device. When the monitor device 400 shown above has a function of allowing a plurality of recording/reproducing devices to be connected thereto, the viewer has to know the signal formats of the plurality of reproduction signals outputted from the individual recording/reproducing devices in order to obtain information on the monitor device with desired ones of the reproduction signals outputted from the plurality of recording/reproducing devices.

DISCLOSURE OF THE INVENTION

An object of the present invention is to provide a monitor device, a connection information setting device, a connection information setting method, and a connection information setting program with which the user can easily obtain video display on the basis of a reproduction signal from a desired apparatus without the need to give an instruction to display a particular signal.

According to one aspect of the invention, a monitor device to which one or a plurality of apparatuses can be connected comprises: combination setting means for grouping one or a plurality of reproduction signals from the one or plurality of apparatuses to set a combination or combinations each comprising one or a plurality of reproduction signals from a same apparatus; reproduction signal selecting means for selecting one from the one or plurality of reproduction signals from the same apparatus on the basis of a combination set by the combination setting means; and display means for displaying the reproduction signal selected by the reproduction signal selecting means.

In the monitor device, among one or a plurality of reproduction signals from the one or plurality of apparatuses, the combination setting means sets a combination or combinations each comprising one or a plurality of reproduction signals from the same apparatus; on the basis of a combination set by the combination setting means, the reproduction signal selecting means selects one from the one or plurality of reproduction signals from the same apparatus; and the display means displays the reproduction signal selected by the reproduction signal selecting means.

In this case, the monitor device can recognize reproduction signals from the same apparatus as a combination; accordingly, when a reproduction signal from the apparatus selected by the user has changed to another reproduction signal from the same apparatus, the new reproduction signal can be displayed automatically. Thus the user can easily obtain video display based on reproduction signals from the desired apparatus just by causing the monitor device to recognize one apparatus as the target of reproduction, without the need to instruct it to display a particular reproduction signal.

The monitor device may further comprise apparatus selecting means for selecting one of the one or plurality of apparatuses, and then, from among the one or plurality of reproduction signals from the apparatus selected by the apparatus selecting means, the reproduction signal selecting means selects one reproduction signal on the basis of the combination set by the combination setting means.

In this case, the apparatus selecting means allows the user to select a desired one from among the one or plurality of apparatuses as the target of reproduction. Then, from among the one or plurality of reproduction signals from the apparatus selected by the apparatus selecting means, the reproduction signal selecting means selects one reproduction signal on the basis of the combination set by the combination setting means. Thus, even when the reproduction signal from the apparatus selected by the user has changed to another reproduction signal from the same apparatus, the new reproduction signal can be displayed automatically.

The monitor device may further comprise: combination obtaining means for obtaining, from the combination setting means, the combination corresponding to the apparatus selected by the apparatus selecting means; input check means for checking to distinguish a reproduction signal that is being inputted from among the one or plurality of reproduction signals from the one or plurality of apparatuses; and control means for controlling the reproduction signal selecting means so that, among the one or plurality of reproduction signals from the apparatus selected by the apparatus selecting means, the reproduction signal selecting means outputs to the display means the reproduction signal distinguished by the input check means, on the basis of the combination obtained by the combination obtaining means.

In this case, from the combination setting means, the combination obtaining means obtains the combination corresponding to the apparatus selected by the apparatus selecting means; then, among the one or plurality of reproduction signals from the one or plurality of apparatuses, the input check means checks to distinguish a reproduction signal that is being inputted; and the control means controls the reproduction signal selecting means so that, among the one or plurality of reproduction signals from the apparatus selected by the apparatus selecting means, the reproduction signal selecting means outputs to the display means the reproduction signal distinguished by the input check means, on the basis of the combination obtained by the combination obtaining means.

Thus, when the reproduction signal inputted from the apparatus selected by the user has changed to another reproduction signal from the same apparatus, the video display can be continued on the basis of the reproduction signal from the same apparatus.

When the input check means judges that the reproduction signal being inputted has changed to another reproduction signal, the control means may check the combination obtained by the combination obtaining means to see whether that another reproduction signal is a reproduction signal sent from the apparatus selected by the apparatus selecting means, and when the another reproduction signal is sent from the apparatus selected by the apparatus selecting means, then the control means may control the reproduction signal selecting means so that the reproduction signal selecting means outputs the another reproduction signal to the display means.

In this case, when the input check means judges that the reproduction signal being inputted has changed to another reproduction signal, the control means checks the combination obtained by the combination obtaining means to see whether the another reproduction signal is sent from the apparatus selected by the apparatus selecting means, and when the another reproduction signal is sent from the apparatus selected by the apparatus selecting means, the control means controls the reproduction signal selecting means to output the another reproduction signal to the display means.

Thus, when a reproduction signal inputted from the apparatus selected by the user has changed to another reproduction signal from the same apparatus, the user can obtain video display based on the desired reproduction signal without the need to instruct the monitor device to display a particular reproduction signal.

When the input check means judges that the reproduction signal being inputted has changed to another reproduction signal, the control means may check the combination obtained by the combination obtaining means to see whether the another reproduction signal is sent from the apparatus selected by the apparatus selecting means, and when the another reproduction signal is not from the apparatus selected by the apparatus selecting means, the control means may control the reproduction signal selecting means so that the reproduction signal selecting means does not output to the display means the reproduction signal being inputted.

In this case, when the input check means judges that the reproduction signal being inputted has changed to another reproduction signal, the control means checks the combination obtained by the combination obtaining means to see whether the another reproduction signal is sent from the apparatus selected by the apparatus selecting means, and when the another reproduction signal is not from the apparatus selected by the apparatus selecting means, the control means controls the reproduction signal selecting means not to output to the display means the reproduction signal being inputted.

Thus, when the reproduction signal inputted from the apparatus selected by the user has changed to another reproduction signal from an apparatus not selected by the user, video display based on the another reproduction signal is not presented. That is to say, the user can obtain video display only on the basis of the reproduction signals from the apparatus the user selected.

When the input check means judges that the reproduction signal being inputted has changed to another reproduction signal, the control means may check the combination obtained by the combination obtaining means to see whether the another reproduction signal is sent from the apparatus selected by the apparatus selecting means, and when the another reproduction signal is not from the apparatus selected by the apparatus selecting means, the control means may control the reproduction signal selecting means so that the reproduction signal selecting means does not output to the display means the reproduction signal being inputted, and the control means may also cause the display means to display information indicating the reproduction signal being inputted.

In this case, when the input check means judges that the reproduction signal being inputted has changed to another reproduction signal, the control means checks the combination obtained by the combination obtaining means to see whether the another reproduction signal is sent from the apparatus selected by the apparatus selecting means, and when the another reproduction signal is not from the apparatus selected by the apparatus selecting means, the control means controls the reproduction signal selecting means not to output to the display means the reproduction signal being inputted, and the control means also causes the display means to display information indicating the reproduction signal being inputted.

Thus, when the reproduction signal inputted from the apparatus selected by the user has changed to another reproduction signal from an apparatus not selected by the user, video display based on the another reproduction signal is not presented, but the user is informed that a reproduction signal is inputted from another apparatus. That is to say, the user can obtain video display only on the basis of the reproduction signals from the apparatus the user selected and also can know that a reproduction signal is being inputted from an apparatus the user did not select.

When the input check means judges that the reproduction signal being inputted has changed to another reproduction signal, the control means may check the combination obtained by the combination obtaining means to see whether the another reproduction signal is sent from the apparatus selected by the apparatus selecting means, and when the another reproduction signal is not from the apparatus selected by the apparatus selecting means, the control means may control the reproduction signal selecting means so that the reproduction signal selecting means outputs to the display means the reproduction signal being inputted.

In this case, when the input check means judges that the reproduction signal being inputted has changed to another reproduction signal, the control means checks the combination obtained by the combination obtaining means to see whether the another reproduction signal is sent from the apparatus selected by the apparatus selecting means, and when the another reproduction signal is not from the apparatus selected by the apparatus selecting means, the control means controls the reproduction signal selecting means to output to the display means the reproduction signal being inputted.

Thus, when the reproduction signal inputted from the apparatus selected by the user has changed to another reproduction signal from an apparatus not selected by the user, the video display is presented on the basis of the another reproduction signal. That is to say, the user can obtain video display on the basis of the reproduction signal being inputted, independently of the selection he/she made.

Each of the one or plurality of apparatuses may output a plurality of reproduction signals of different signal formats. In this case, a plurality of reproduction signals of different signal formats are outputted from each of the one or plurality of apparatuses. Then the monitor device provides video display on the basis of the plurality of signal formats.

The plurality of reproduction signals of different signal formats may include an analog signal and a digital signal. In this case, the monitor device provides video display on the basis of the analog and digital signals.

The input check means may distinguish the reproduction signal being inputted on the basis of an identification signal contained in the digital signal. In this case, the reproduction signal being inputted is distinguished by the input check means on the basis of the identification signal contained in the digital signal.

The monitor device may further comprise: a plurality of first terminals receiving a plurality of analog signals; and at least one second terminal receiving a plurality of digital signals; wherein the combination setting means may comprise: input means for entering combinations each comprising one of the analog signals received at the plurality of first terminals and one of the plurality of digital signals received at the at least one second terminal; and storage means for storing the combinations entered by the input means.

In this case, a plurality of analog signals are received at the plurality of first terminals and a plurality of digital signals are received at the at least one second terminal. In the combination setting means, the input means enters combinations each comprising one of the analog signals received at the plurality of first terminals and one of the plurality of digital signals received at the at least one second terminal, and the storage means stores the combinations entered by the input means.

Thus, the user can store in the monitor device each combination of an analog signal and a digital signal sent from the same apparatus as a combination of the first terminal receiving the analog signal and the digital signal.

The monitor device may further comprise decoding means for decoding the digital signals received at the at least one second terminal, and then the reproduction signal selecting means selects an analog signal inputted to one of the plurality of first terminals or a digital signal decoded by the decoding means.

In this case, the digital signals received at the at least one second terminal are decoded by the decoding means. The reproduction signal selecting means then selects an analog signal inputted to one of the plurality of first terminals or a digital signal decoded by the decoding means.

The monitor device may further comprise identification information setting means for setting, in the plurality of reproduction signals from the one or plurality of apparatuses, identification information for identifying the plurality of reproduction signals, and then the combination setting means may set each combination of reproduction signals from the same apparatus by using the identification information set by the identification information setting means.

In this case, with the identification information setting means, the user can set identification information for identifying the plurality of reproduction signals from the one or plurality of apparatuses. Then the combination setting means sets each combination of reproduction signals from the same apparatus by using the identification information set by the identification information setting means.

Thus, by using the identification information, the user can easily set in the monitor device each combination of reproduction signals from the same apparatus.

The identification information setting means may set a character string as the identification information in each reproduction signal.

In this case, a character string is set for each reproduction signal as the identification information by the identification information setting means.

Thus, the user can easily set each combination of reproduction signals from the same apparatus on the basis of the identification information formed of a character string.

The one or plurality of reproduction signals may each include a video signal, and then the display means displays a video on the basis of the video signal selected by the reproduction signal selecting means. In this case, the video based on the selected video signal is displayed by the display means.

Another aspect of the invention is directed to a connection information setting device for setting information about connection made to a monitor device to which one or a plurality of apparatuses can be connected, wherein the connection information setting device comprises: input means for entering a combination or combinations each comprising one or a plurality of reproduction signals from a same apparatus by grouping a plurality of reproduction signals from the one or plurality of apparatuses, and storage means for storing the combination or combinations entered by the input means.

In the connection information setting device, among the plurality of reproduction signals from the one or plurality of apparatuses, the input means enters a combination or combinations each comprising one or a plurality of reproduction signals from the same apparatus and the storage means stores the combinations entered by the input means.

When used with a monitor device, the connection information setting device allows the monitor device to recognize reproduction signals from the same apparatus as a combination; therefore, when the reproduction signal from the apparatus selected by the user has changed to another reproduction signal from the same apparatus, the new reproduction signal can be displayed automatically. Thus the user can easily obtain video display on the basis of reproduction signals from a desired apparatus just by allowing the monitor device to recognize one apparatus as the target of reproduction, without the need to instruct the monitor device to display a particular reproduction signal.

A further aspect of the present invention is directed to a connection information setting method for setting information about connection made to a monitor device to which one or a plurality of apparatuses can be connected, wherein the connection information setting method comprises the steps of: entering a combination or combinations each comprising one or a plurality of reproduction signals from a same apparatus by grouping one or a plurality of reproduction signals from the one or plurality of apparatuses, and storing the combination or combinations thus entered.

Thus, among one or a plurality of reproduction signals from the one or plurality of apparatuses, the connection information setting method enters and stores a combination or combinations each comprising one or a plurality of reproduction signals from a same apparatus.

When used with a monitor device, the connection information setting method allows the monitor device to recognize reproduction signals from the same apparatus as a combination, so that when the reproduction signal from the apparatus selected by the user has changed to another reproduction signal from the same apparatus, the new reproduction signal can be displayed automatically. Thus the user can easily obtain video display on the basis of reproduction signals from a desired apparatus just by allowing the monitor device to recognize one apparatus as the target of reproduction, without the need to instruct the monitor device to display a particular reproduction signal.

Another aspect of the present invention is directed to a connection information setting program that can be read by a processing device and that is for setting information about connection made to a monitor device to which one or a plurality of apparatuses can be connected, wherein the connection information setting program causes the processing device to execute a processing comprising the steps of: entering a combination or combinations each comprising one or a plurality of reproduction signals from a same apparatus by grouping one or a plurality of reproduction signals from the one or plurality of apparatuses, and storing the combination or combinations thus entered.

Thus, among one or a plurality of reproduction signals from the one or plurality of apparatuses, the connection information setting program enters and stores a combination or combinations each comprising one or a plurality of reproduction signals from the same apparatus.

When used with a monitor device, the connection information setting program allows the monitor device to recognize reproduction signals from the same apparatus as a combination, so that when the reproduction signal from the apparatus selected by the user has changed to another reproduction signal from the same apparatus, the new reproduction signal can be displayed automatically. Thus the user can easily obtain video display on the basis of reproduction signals from a desired apparatus just by allowing the monitor device to recognize one apparatus as the target of reproduction, without the need to instruct the monitor device to display a particular reproduction signal.

According to a further aspect of the invention, a monitor device to which one or a plurality of apparatuses can be connected comprises: a combination setting device that groups one or a plurality of reproduction signals from the one or plurality of apparatuses to set a combination or combinations each comprising one or a plurality of reproduction signals from a same apparatus; a reproduction signal selecting device that selects one from the one or plurality of reproduction signals from the same apparatus on the basis of a combination set by the combination setting device; and a display device that displays the reproduction signal selected by the reproduction signal selecting device.

According to the monitor device, among one or a plurality of reproduction signals from the one or plurality of apparatuses, the combination setting device sets a combination or combinations each comprising one or a plurality of reproduction signals from a same apparatus; then, on the basis of a combination set by the combination setting device, the reproduction signal selecting device selects one from the one or plurality of reproduction signals from the same apparatus, and the display device displays the reproduction signal selected by the reproduction signal selecting device.

In this case, the monitor device can recognize reproduction signals from the same apparatus as a combination, so that even when the reproduction signal from the apparatus selected by the user has changed to another reproduction signal from the same apparatus, the new reproduction signal can be displayed automatically. Thus the user can easily obtain video display on the basis of reproduction signals from a desired apparatus just by allowing the monitor device to recognize one apparatus as the target of reproduction, without the need to instruct the monitor device to display a particular reproduction signal.

The monitor device may further comprise an apparatus selecting device that selects one of the one or plurality of apparatuses, and then, from among the one or plurality of reproduction signals from the apparatus selected by the apparatus selecting device, the reproduction signal selecting device selects one reproduction signal on the basis of the combination set by the combination setting device.

In this case, the apparatus selecting device allows the user to select a desired one of the one or plurality of apparatuses as the target of reproduction. Then, from among the one or plurality of reproduction signals from the apparatus selected by the apparatus selecting device, the reproduction signal selecting device selects one reproduction signal on the basis of the combination set by the combination setting device. Thus, when the reproduction signal from an apparatus selected by the user has changed to another reproduction signal from the same apparatus, the new reproduction signal can be displayed automatically.

The monitor device may further comprise: a combination obtaining device that obtains, from the combination setting device, the combination corresponding to the apparatus selected by the apparatus selecting device; an input check device that checks to distinguish a reproduction signal that is being inputted from among the one or plurality of reproduction signals from the one or plurality of apparatuses; and a control device that controls the reproduction signal selecting device so that, among the one or plurality of reproduction signals from the apparatus selected by the apparatus selecting device, the reproduction signal selecting device outputs to the display device the reproduction signal distinguished by the input check device, on the basis of the combination obtained by the combination obtaining device.

In this case, from the combination setting device, the combination obtaining device obtains the combination corresponding to the apparatus selected by the apparatus selecting device; then, among the one or plurality of reproduction signals from the one or plurality of apparatuses, the input check device checks the input to distinguish a reproduction signal that is being inputted; and the control device controls the reproduction signal selecting device so that, among the one or plurality of reproduction signals from the apparatus selected by the apparatus selecting device, the reproduction signal selecting device outputs to the display device the reproduction signal distinguished by the input check device, on the basis of the combination obtained by the combination obtaining device.

Thus, when the reproduction signal inputted from the apparatus selected by the user has changed to another reproduction signal from the same apparatus, the user can continuously obtain video display on the basis of the reproduction signal from the same apparatus.

Another aspect of the present invention is directed to a connection information setting device for setting information about connection made to a monitor device to which one or a plurality of apparatuses can be connected, wherein the connection information setting device comprises: an input device that enters a combination or combinations each comprising one or a plurality of reproduction signals from a same apparatus by grouping a plurality of reproduction signals from the one or plurality of apparatuses, and a storage device that stores the combination or combinations entered by the input device.

In the connection information setting device, among the plurality of reproduction signals from the one or plurality of apparatuses, the input device enters a combination or combinations each comprising one or a plurality of reproduction signals from a same apparatus, and the storage device stores the combination or combinations entered by the input device.

When used with a monitor device, the connection information setting device allows the monitor device to recognize reproduction signals from the same apparatus as a combination, so that even when the reproduction signal from the apparatus selected by the user has changed to another reproduction signal from the same apparatus, the new reproduction signal can be displayed automatically. Thus the user can easily obtain video display on the basis of reproduction signals from a desired apparatus just by allowing the monitor device to recognize one apparatus as the target of reproduction, without the need to instruct the monitor device to display a particular reproduction signal.

BRIEF DESCRIPTION OF THE DRAWINGS

FIG. 6 is a diagram showing an example of a connected apparatus table that is stored in the storage.

FIG. 7 is a diagram showing an example of an apparatus connection setting screen for setting the correspondence between connected apparatuses and reproduction signals.

FIG. 8 is a diagram showing an example of a screen display for determining an apparatus as the target of setting.

FIG. 9 is a diagram showing an example of a screen display for determining the correspondence between an apparatus and a signal.

FIG. 10 is a diagram showing an example of a screen display for determining the correspondence between an apparatus and a signal.

FIG. 18 is a block diagram showing the structure of a monitor device that can handle digital and analog signals.

BEST MODE FOR CARRYING OUT THE INVENTION

An embodiment of the present invention is now described referring to FIGS. 1 to 14.

Figure 1:
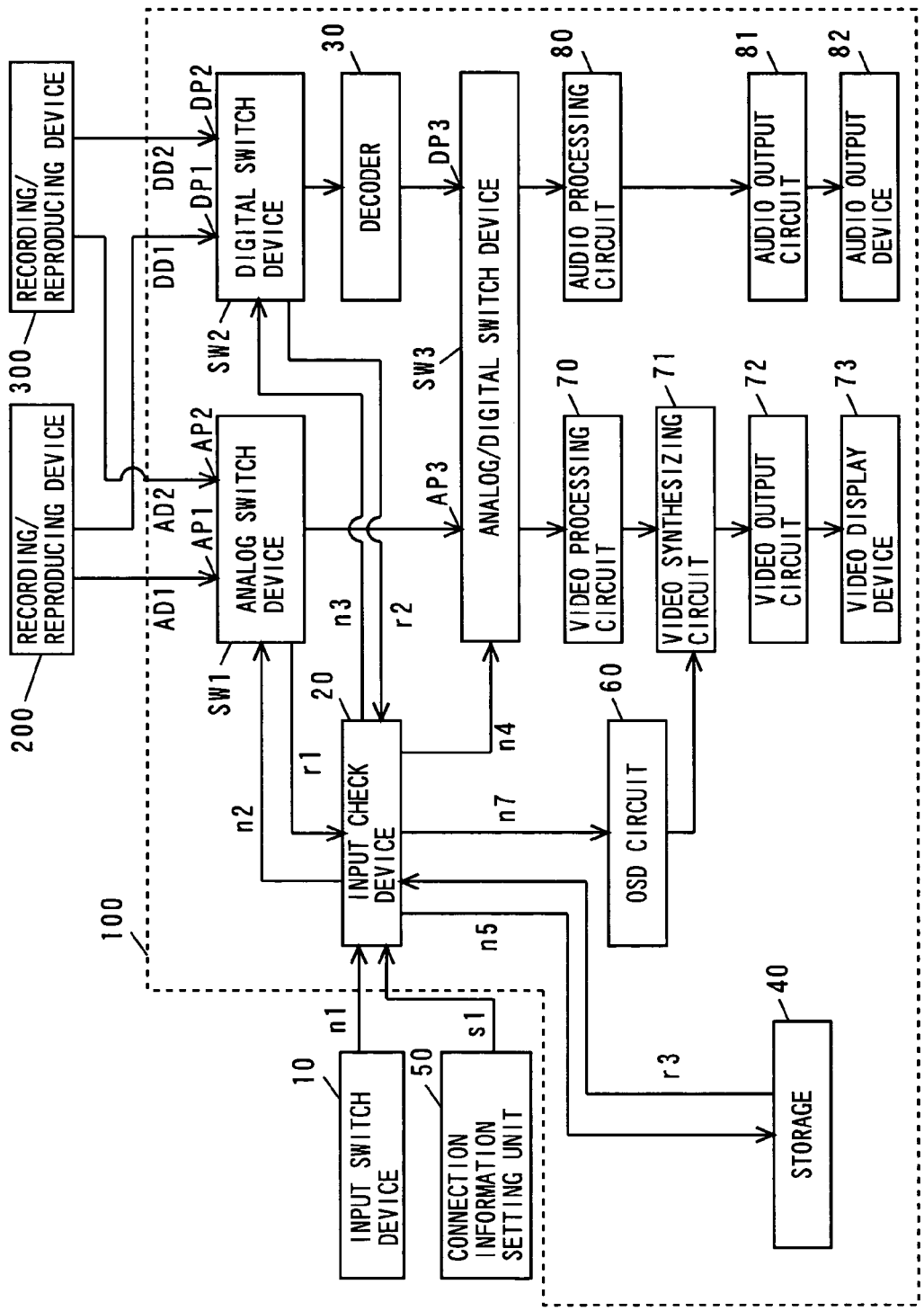
FIG. 1 is a block diagram showing the structure of a monitor device according to an embodiment of the invention and an example of connection with a plurality of recording/reproducing devices.

FIG. 1 is a block diagram that shows the structure of a monitor device of one embodiment of the invention and an example of connection with a plurality of recording/reproducing devices. This monitor device is used in a television receiver, for example.

In FIG. 1, the monitor device 100 is connected with a recording/reproducing device 200 and a recording/reproducing device 300 and receives given instructions from an input switch device 10 and a connection information setting unit 50 to operate as will be described below.

The recording/reproducing devices 200 and 300 are videocassette recorders, for example. When the recording/reproducing devices 200 and 300 are videocassette recorders, they record information inputted from the monitor device 100 on videotape or outputs information recorded on videotape as a reproduction signal to the monitor device 100.

The input switch device 10, typically a remote controller, instructs the monitor device 100 to perform given operations. The viewer can operate the input switch device 10 to select one of the plurality of recording/reproducing devices connected to the monitor device 100 and specify it as the target apparatus to be reproduced.

As well as the input switch device 10, the connection information setting unit 50 is also a remote controller. The connection information setting unit 50 is used to set the correspondence between the recording/reproducing devices and the terminals and the correspondence between the recording/reproducing devices and the reproduction signals. A method for setting various information will be described later.

The monitor device 100 includes an input check device 20, an analog switch device SW1, a digital switch device SW2, an analog/digital switch device SW3, a decoder 30, a storage 40, an OSD (On Screen Display) circuit 60, a video processing circuit 70, a video synthesizing circuit 71, a video output circuit 72, a video display device 73, an audio processing circuit 80, an audio output circuit 81, and an audio output device 82.

The input check device 20, composed of a CPU (Central Processing Unit), selects a reproduction signal from the reproduction target apparatus and performs various operations as will be described later, so as to cause the monitor device 100 to provide video display and audio output on the basis of that reproduction signal.

The analog switch device SW1 has an analog terminal AP1 and an analog terminal AP2. The analog switch device SW1 outputs to the analog/digital switch device SW3 one of the reproduction signals inputted from the recording/reproducing device 200 connected to the analog terminal AP1 through a cable and the recording/reproducing device 300 connected to the analog terminal AP2 through a cable. In this case, the reproduction signals are analog signals each including video and audio signals.

The digital switch device SW2 has a digital terminal DP1 and a digital terminal DP2. The digital switch device SW2 outputs to the decoder 30 one of the reproduction signals inputted from the recording/reproducing device 200 connected to the digital terminal DP1 through a cable and the recording/reproducing device 300 connected to the digital terminal DP2 through a cable. In this case, the reproduction signals are digital signals each including video and audio signals.

The digital switch device SW2 extracts information attached to the digital signals DD1 and DD2, as will be described later, and outputs to the input check device 20 a signal r2 indicating the contents of the attached information. While this embodiment shows an example in which the digital switch device SW2 extracts the attached information, the information may be extracted by the decoder 30 described below.

The analog/digital switch device SW3 has an analog port AP3 and an analog port DP3. The analog/digital switch device SW3 receives an analog signal at the analog port AP3 and an analog signal decoded in the decoder 30 at the analog port DP3. Then, on the basis of an instruction from the input check device 20, the analog/digital switch device SW3 selects the analog signal from the analog port AP3 or the analog signal decoded in the decoder 30 and inputted from the analog port DP3. Then the analog/digital switch device SW3 outputs the video signal contained in the selected reproduction signal to the video processing circuit 70 and outputs the audio signal contained in the selected reproduction signal to the audio processing circuit 80.

The decoder 30 decodes the digital signal sent from the digital switch device SW2 and outputs the decoded analog signal to the analog/digital switch device SW3.

The storage 40 stores information as to which of the plurality of recording/reproducing devices connected to the monitor device 100 is the current target of reproduction, stores a connected apparatus table showing to which terminals the recording/reproducing devices are connected and which reproduction signals they output, and also stores a connection information setting program of the invention. The connected apparatus table will be described later in detail.

The OSD circuit 60 outputs a graphic signal to the video synthesizing circuit 71 to superimpose characters etc. on the image displayed on the screen of the video display device 73. The video processing circuit 70 applies given processing to the video signal inputted from the analog/digital switch device SW3 and outputs the video signal to the video synthesizing circuit 71.

The video synthesizing circuit 71 synthesizes the graphic signal from the OSD circuit 60 and the video signal from the video processing circuit 70 and outputs the synthesized video signal to the video output circuit 72. When the graphic signal from the OSD circuit 60 is absent, only the video signal from the video processing circuit 70 is outputted to the video output circuit 72.

The video output circuit 72 outputs the input video signal to the video display device 73. The video display device 73, including, e.g. a cathode-ray tube, liquid crystal, or plasma display, provides video display on the basis of the input video signal. The video processing circuit 70, video synthesizing circuit 71, video output circuit 72, and video display device 73 form the video display system.

The audio processing circuit 80 applies given processing to the audio signal inputted from the analog/digital switch device SW3 and outputs the audio signal to the audio output circuit 81. The audio output circuit 81 outputs the input audio signal to the audio output device 82. The audio output device 82, including a speaker etc., provides audio output on the basis of the input audio signal. The audio processing circuit 80, audio output circuit 81, and audio output device 82 form the audio output system.

Operations of the monitor device 100 of this embodiment of the invention are now described referring to FIGS. 1 to 5. FIGS. 2 to 5 are schematic diagrams showing an example of the paths of reproduction signals and images thus displayed.

The digital signals DD1 and DD2 each contain a signal for identification of their sources. A plurality of digital signals can be inputted to a single digital terminal. In the example of FIG. 1, the digital signals DD1 and DD2 are inputted respectively to the digital terminals DP1 and DP2, but the digital terminals DP1 and DP2 are connected electrically in common. The digital signals DD1 and DD2 can be identified with the signals contained therein. On the other hand, the analog signals AD1 and AD2, containing no signal for identification of their sources, are identified on the basis of the analog terminals AP1 and AP2 to which they are applied.

In the description below, the monitor device 100 identifies the analog signals AD1 and AD2 from the recording/reproducing devices 200 and 300 on the basis of the analog terminals AP1 and AP2 to which they are applied, and it identifies the digital signals DD1 and DD2 from the recording/reproducing devices 200 and 300 on the basis of the signals contained therein. The identification is accomplished by the input check device 20 in the monitor device 100 by referring to the connected apparatus table showing the correspondence between the connected apparatuses and the input reproduction signals, as will be described later.

In the connected apparatus table, the recording/reproducing device 200 is set as a connected apparatus that outputs the analog signal AD1 to the monitor device 100 through the analog terminal AP1 or a connected apparatus that outputs the digital signal DD1 to the monitor device 100, and the recording/reproducing device 300 is set as a connected apparatus that outputs the analog signal AD2 to the monitor device 100 through the analog terminal AP2 or a connected apparatus that outputs the digital signal DD2 to the monitor device 100.

Figure 2:
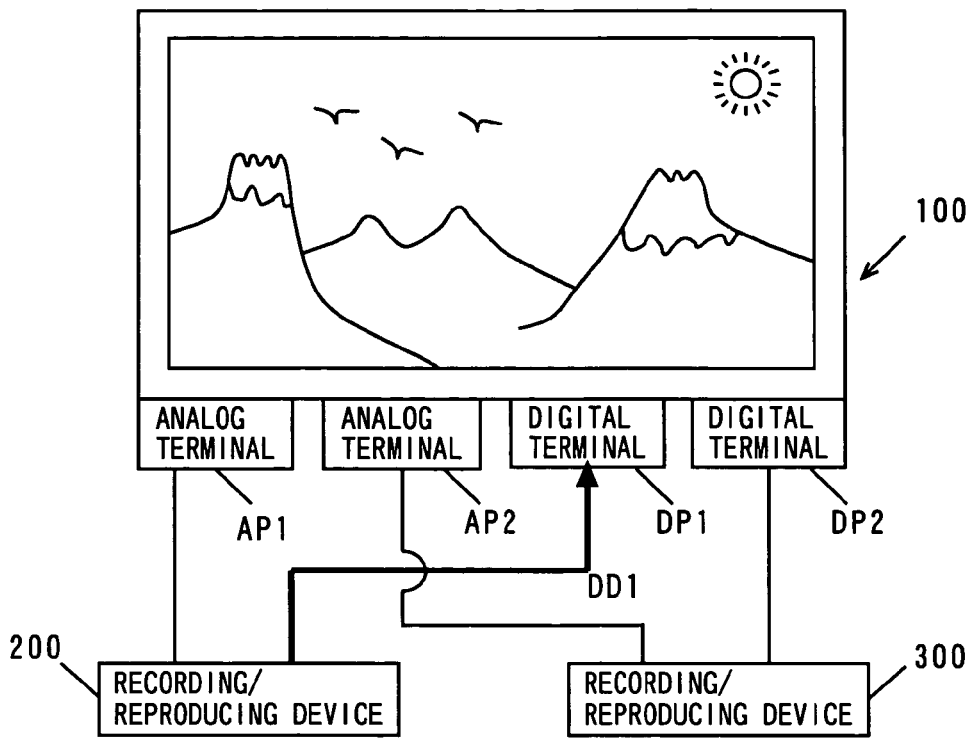
FIG. 2 is a schematic diagram showing the path of a reproduction signal and an example of video displayed on the basis of it.

In FIG. 2, with the recording/reproducing devices 200 and 300 connected to the monitor device 100, the monitor device 100 is providing video display and audio output on the basis of a reproduction signal from the recording/reproducing device 200. In FIG. 2, the monitor device 100 is displaying a scenic image on the basis of the digital signal DD1.

The operations at this time of the internal components of the monitor device 100 are now described referring to FIG. 1. The digital signal DD1 from the recording/reproducing device 200 is inputted to the digital switch device SW2 and further outputted from the digital switch device SW2 to the decoder 30. Then the decoder 30 converts the digital signal DD1 to analog form and outputs it to the analog/digital switch device SW3, where the signal DD1 is separated into a video signal and an audio signal and outputted respectively to the video display system and the audio output system. In the video display system, the video signal is processed through the video processing circuit 70, video synthesizing circuit 71, video output circuit 72 and video display device 73 and displayed as a video. In the audio signal system, the audio signal is processed through the audio processing circuit 80, audio output circuit 81, and audio output device 82 and outputted as sound.

In the operation above, the digital switch device SW2 outputs to the input check device 20 the signal r2 that indicates the contents of the information attached to the digital signal DD1. It is now assumed that the input switch device 10 has already set the information showing that the current reproduction target is the recording/reproducing device 200. Then, on the basis of the signal r2 indicating the contents of the attached information and the information designating the recording/reproducing device 200 as the target of reproduction, which is obtained by referring to storage 40, the input check device 20 recognizes that it should provide video display and audio output with the digital signal DD1. Then the input check device 20 outputs an instruction signal n3 to the digital switch device SW2 to cause it to output the digital signal DD1, and outputs an instruction signal n4 to the analog/digital switch device SW3 to cause it to output the input from the analog port DP3.

Figure 3:
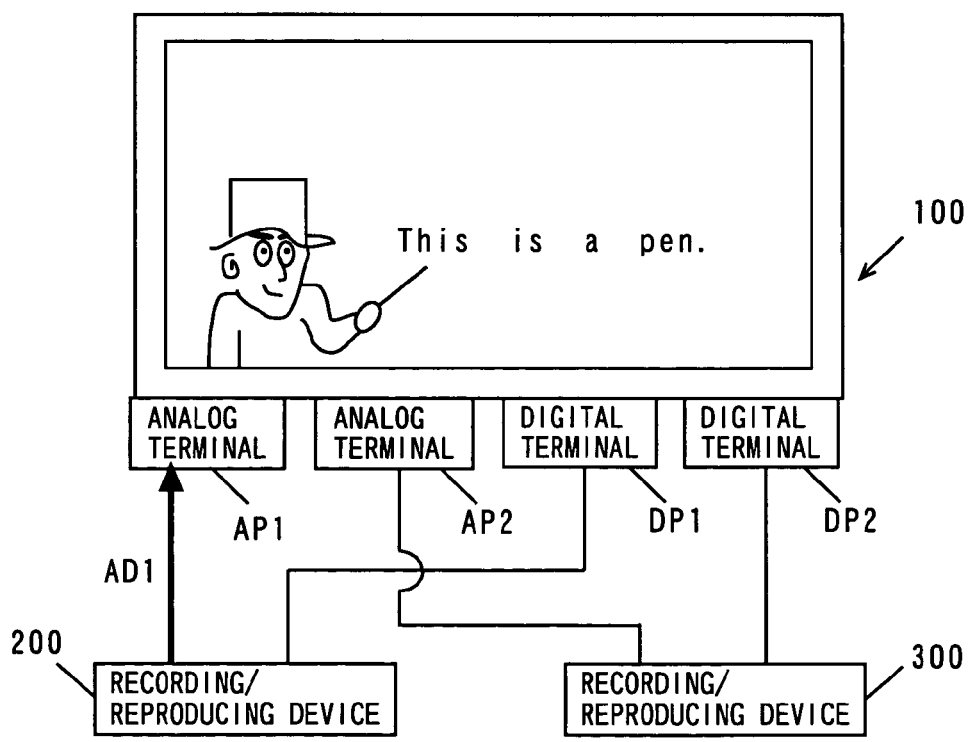
FIG. 3 is a schematic diagram showing the path of a reproduction signal and an example of video displayed on the basis of it.

Now, suppose that the reproduction signal from the recording/reproducing device 200 has changed to the analog signal AD1. In this case, the monitor device 100 recognizes that the reproduction signal from the recording/reproducing device 200 has changed from the digital signal DD1 to the analog signal AD1. Then the monitor device 100 switches the reproduction signal output path so that it can provide video display and audio output with the analog signal AD1. In FIG. 3, the monitor device 100 is displaying an educational video on the basis of the analog signal AD1.

Operations at this time of the internal components of the monitor device 100 are described referring to FIG. 1. The input check device 20 recognizes that the signal r2 from the digital switch device SW2, which indicates the contents of the information attached to the digital signal DD1, has been interrupted. The analog switch device SW1 outputs to the input check device 20 a signal r1 to show that the analog signal AD1 is inputted to its analog terminal AP1. Receiving the signal r1, the input check device 20 then outputs to the storage 40 an instruction signal n5 showing that the current target of reproduction is the recording/reproducing device 200. Then the storage 40 outputs to the input check device 20 a signal r3 that shows the relation between the reproduction target apparatus and the reproduction signals that is set in the connection apparatus table described later. Then the input check device 20 recognizes that the analog signal AD1 to the analog terminal AP1 is a reproduction signal from the recording/reproducing device 200 to be currently reproduced, and the input check device 20 outputs to the analog switch device SW1 an instruction signal n2 to cause it to output the analog signal AD1 to the analog/digital switch device SW3. The input check device 20 also outputs to the analog/digital switch device SW3 the instruction signal n4 to cause it to output the analog signal supplied to the analog port AP3 to the video display system and the audio output system.

In the description above, the input check device 20 recognizes the absence of the digital signal DD1 by checking whether the signal r2, showing the information attached to the digital signal DD1, is present or absent. However, the information attached to the digital signal DD1 may include information that "the output from the recording/reproducing device 200 is no longer of digital signal format" or that "the output from the recording/reproducing device 200 has changed to the analog signal format," and then, on the basis of the signal r2, the input check device 20 can vary the instruction signals n2, n3 and n4 so as to allow the analog signal AD1 to the analog terminal AP1 to be provided as the output.

Thus, the analog signal AD1 is outputted through the analog switch device SW1 and the analog/digital switch device SW3 to the video display system and the audio output system. The video signal and the audio signal contained in the analog signal AD1 are processed respectively in the video display system and the audio signal system through the output paths described earlier.

Figure 4:
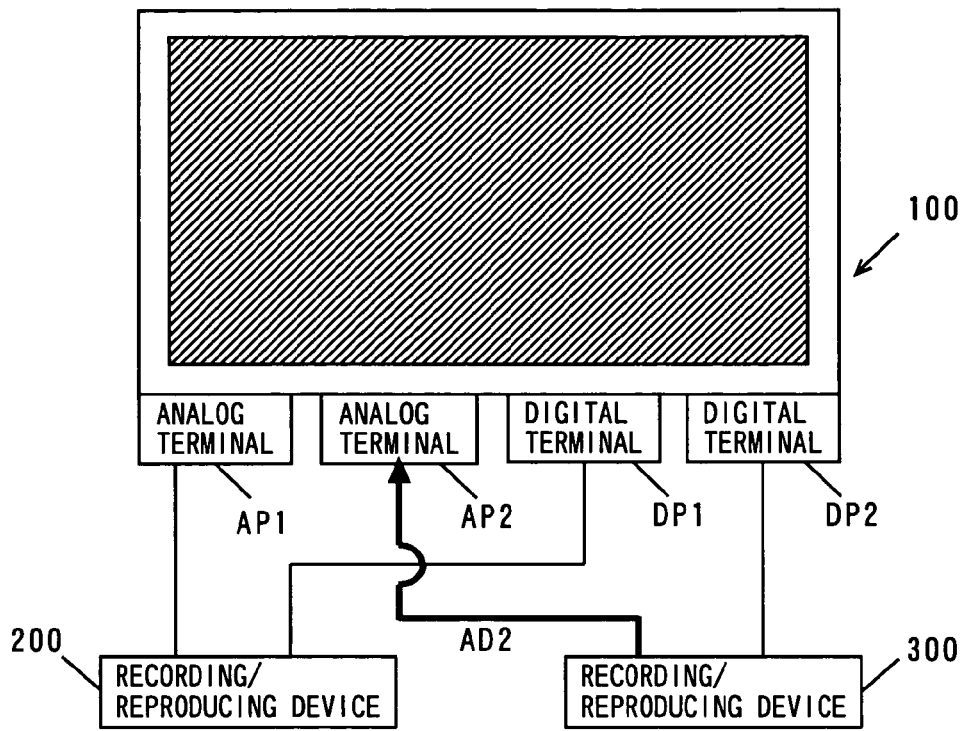
FIG. 4 is a schematic diagram showing the path of a reproduction signal and an example of video displayed on the basis of it.

Next, in the condition of FIG. 3, suppose that both analog and digital reproduction signals from the recording/reproducing device 200 have been interrupted and a reproduction signal is inputted from the recording/reproducing device 300. Then the monitor device 100 recognizes the absence of reproduction signal from the recording/reproducing device 200. Then, as shown in FIG. 4, the monitor device 100 blacks out the display or present a screen display like a sandstorm with noise.

Operations at this time of the internal components of the monitor device 100 are now described referring to FIG. 1. The analog switch device SW1 outputs to the input check device 20 the signal r1 to show that the input of the analog signal AD1 to the analog terminal AP1 has been interrupted and that the analog terminal AP2 is receiving the analog signal AD2. Receiving the signal r1, the input check device 20 outputs to the storage 40 the instruction signal n5 indicating that the current target of reproduction is the recording/reproducing device 200. Then the storage 40 outputs to the input check device 20 the signal r3 that shows the relation between the reproduced apparatus and the reproduction signals set in the connected apparatus table described later.

Receiving the signal r3, the input check device 20 recognizes that both of the analog signal AD1 and the digital signal DD1 from the recording/reproducing device 200 are absent and that the analog signal AD2 to the analog terminal AP2 is not from the recording/reproducing device 200. Then the input check device 20 does not output the instruction signals n2 and n4 to the analog switch device SW1 and the analog/digital switch device SW3. Therefore no reproduction signal is inputted to the video display system and the audio output system of the monitor device 100. Changing the reproduction target of the monitor device 100 requires that the input switch device 10 send the instruction signal n1 to change the target of reproduction.

The monitor device 100 may display a predetermined image instead of blacking out the display or of providing a screen display like a sandstorm with noise.

The monitor device 100 may presume that the analog signal AD2 is supplied as input to the analog terminal AP2 on the basis of the information attached to the digital signal DD2 from the recording/reproducing device 300.

Suppose that, in the condition of FIG. 4, the viewer has operated the input switch device 10 to send to the monitor device 100 an instruction signal indicating that "the current target of reproduction is changed to the recording/reproducing device 300," so as to obtain the video and audio with the reproduction signal from the recording/reproducing device 300.

Figure 5:
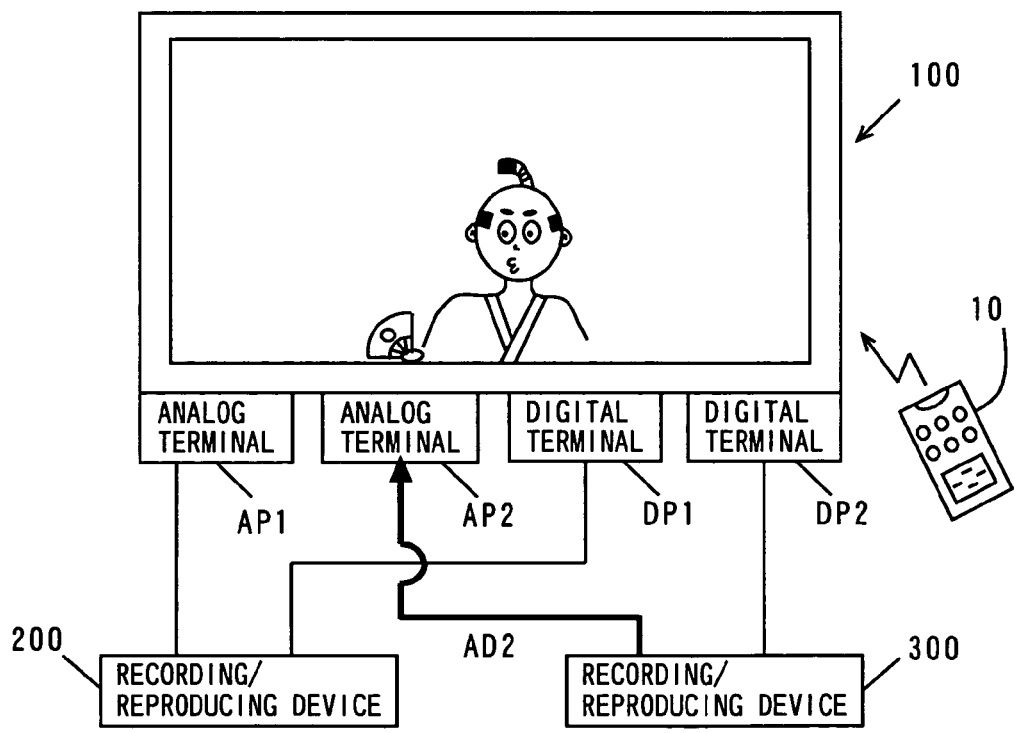
FIG. 5 is a schematic diagram showing the path of a reproduction signal and an example of video displayed on the basis of it.

Receiving the instruction signal from the viewer indicating that the target of reproduction is changed to the recording/reproducing device 300, the monitor device 100 provides, as shown in FIG. 5, video display and audio output with the analog signal AD2, i.e. the reproduction signal from the recording/reproducing device 300. In FIG. 5, the monitor device 100 displays a historical video.

Operations at this time of the input switch device 10 and the internal components of the monitor device 100 are now described referring to FIG. 1. The input switch device 10, operated by the viewer, sends to the input check device 20 in the monitor device 100 the instruction signal n1 indicating that "the current target of reproduction is changed to the recording/reproducing device 300." Then, on the basis of the instruction signal n1, the input check device 20 regards the recording/reproducing device 300 as the current target of reproduction and outputs to the storage 40 the instruction signal n5 indicating that the current target of reproduction is the recording/reproducing device 300. Then the storage 40 outputs to the input check device 20 the signal r3 showing the relation between the reproduction target apparatus and the reproduction signals set in the connected apparatus table described later.

Receiving the signal r3, the input check device 20 recognizes that the analog signal AD2 to the analog terminal AP2 of the analog switch device SW1 is a reproduction signal from the recording/reproducing device 300 that is to be reproduced currently, and outputs to the analog switch device SW1 the instruction signal n2 to cause it to output the analog signal AD2 to the analog/digital switch device SW3. Also, the input check device 20 outputs to the analog/digital switch device SW3 the instruction signal n4 to cause it to output the analog signal AD2 inputted to the analog port AP3 to the video display system and the audio output system.

Thus the analog signal AD2 is outputted through the analog switch device SW1 and the analog/digital switch device SW3 to the video display system and the audio output system. The video signal and the audio signal are processed through the output paths described above in the video display system and the audio signal system, respectively.

In FIG. 4, when the reproduction signal from the recording/reproducing device 300 is the digital signal DD2, the monitor device 100 provides video display and audio output with the digital signal DD2 in the same way as with the analog signal AD2 shown in FIG. 5.

As described so far, in this embodiment, when the input from a connected apparatus selected as the current target of reproduction has changed from a reproduction signal of one format to that of another format from the same apparatus, the video display and audio output are automatically switched from that one signal format to the another signal format. On the other hand, when the input of a reproduction signal from a connected apparatus selected as the current target of reproduction has changed to a reproduction signal from another connected apparatus, the monitor device does not provide video display and audio output with the reproduction signal from the another apparatus; when the another apparatus is selected as the current target of reproduction through operation by the viewer, then the monitor device provides the video display and audio output with the reproduction signal from the another apparatus. That is to say, in this embodiment, the monitor device does not provide video display and audio output with a reproduction signal from a connected apparatus that is not selected as the target of reproduction by the viewer.

Now, the connected apparatus table, mentioned above, is described referring to FIGS. 6 and 7.

FIG. 6 is a diagram showing an example of the connected apparatus table that is stored in the storage 40.

The connected apparatus table shown in FIG. 6 shows the correlation between the connected apparatus information and the analog terminals, to which the analog signals are inputted, and the digital signals. The connected apparatus information shows the identification of the plurality of connected apparatuses. In this example, the connected apparatus information corresponding to the recording/reproducing device 200 is shown as R1 and the connected apparatus information corresponding to the recording/reproducing device 300 is shown as R2.

According to FIG. 6, the reproduction signal outputted from the recording/reproducing device 200 is the analog signal AD1 inputted to the monitor device 100 through the analog terminal AP1 or the digital signal DD1 inputted to the monitor device 100. The reproduction signal outputted from the recording/reproducing device 300 is the analog signal AD2 inputted to the monitor device 100 through the analog terminal AP2 or the digital signal DD2 inputted to the monitor device 100. That is to say, the connected apparatus table of FIG. 6 shows that the analog signal AD1 to the analog terminal AP1 and the digital signal DD1 are the reproduction signals from the same apparatus represented by the connected apparatus information R1 and that the analog signal AD2 to the analog terminal AP2 and the digital signal DD2 are the reproduction signals from the same apparatus represented by the connected apparatus information R2. As mentioned earlier, the input check device 20 refers to the connected apparatus table to switch the reproduction signal.

Next, an example of a method for setting the connected apparatus table is now described. When a means is available for inputting the connected apparatus table of FIG. 6 into the storage 40, the table setting method is not limited to that shown below.

The connected apparatus table is set by the viewer of the monitor device 100 by operating the connection information setting unit 50.

FIG. 7 is a diagram showing an example of a screen display for setting the correspondence between the connected apparatuses and the reproduction signals. The viewer sets the connected apparatus table while viewing this apparatus connection setting screen shown in FIG. 7.

In this case, the monitor device 100 and the connection information setting unit 50 operate as shown below.

The viewer operates the connection information setting unit 50 to send to the input check device 20 in the monitor device 100 an instruction signal s1 to indicate that the connected apparatus table is now set. Then the input check device 20 reads from the storage 40 the OSD information for setting the connection information and outputs it as an instruction signal n7 to the OSD circuit 60. On the basis of the instruction signal n7, the OSD circuit 60 outputs the graphic signal to the video synthesizing circuit 71. Thus the apparatus connection setting screen of FIG. 7 is displayed in the video display device 73 through the video output circuit 72.

The connection setting screen shown FIG. 7 provides a table with five rows and two columns that show VIDEO 1, VIDEO 2, VIDEO 3, COLOR-DIFFERENCE VIDEO 1, and COLOR-DIFFERENCE VIDEO 2. The VIDEO 1, VIDEO 2, VIDEO 3, COLOR-DIFFERENCE VIDEO 1 and COLOR-DIFFERENCE VIDEO 2 in the left column are used as reference for identifying the connected apparatuses.

For example, with the monitor device 100 of FIG. 1, the viewer regards the recording/reproducing device 200 connected to the analog terminal AP1 as VIDEO 1 and the recording/reproducing device 300 connected to the analog terminal AP2 as VIDEO 2. In this way, VIDEO 1, VIDEO 2, VIDEO 3, COLOR-DIFFERENCE VIDEO 1, and COLOR-DIFFERENCE VIDEO 2 in the left column correspond to the analog terminals of the monitor device 100. In the apparatus connection setting screen of FIG. 7, the number of rows and the number of columns are determined by the number of terminals of the monitor device 100. Therefore the numbers of rows and columns differ depending on the number of terminals of the monitor device 100.

In the example of FIG. 7, the monitor device 100 has three normal analog terminals each including three pin terminals (one pin terminal for video signal and two pin terminals for audio signal) and analog terminals called D terminals (input/output terminals for color-difference signals). The monitor device 100 displays recording/reproducing devices connected to the normal analog terminals as VIDEO 1, VIDEO 2, or VIDEO 3, and recording/reproducing devices connected to the D terminals as COLOR-DIFFERENCE VIDEO 1 and COLOR-DIFFERENCE VIDEO 2.

VIDEO 1, VIDEO 2, VIDEO 3, COLOR-DIFFERENCE VIDEO 1, and COLOR-DIFFERENCE VIDEO 2 displayed in the right column are varied as the viewer operates the connection information setting unit 50. How they are varied will be described below in detail.

FIG. 8 is a diagram showing an example of a screen display for determining the target apparatus to be set. The viewer determines the target of setting on the apparatus connection setting screen shown in FIG. 7. For example, when the recording/reproducing device 200 connected to the analog terminal AP1 is determined to be the target of setting, VIDEO 1 in the left column is highlighted (enhanced) as the target of setting.

In this case the monitor device 100 and the connection information setting unit 50 operate as shown below.

The viewer chooses a connected apparatus as the target of setting on the apparatus connection setting screen shown in FIG. 7. At this time, for example, the viewer operates the connection information setting unit 50 to send to the input check device 20 an instruction signal showing that the connected apparatus shown as VIDEO 1 is the target of setting. The input check device 20 recognizes that the target of setting is VIDEO 1 and sends to the OSD circuit 60 the instruction signal n7 to highlight VIDEO 1 in the left column on the screen display of FIG. 7. On the basis of the instruction signal n7, the OSD circuit 60 outputs a graphic signal to the video synthesizing circuit 71. Then, as shown in FIG. 8, the video display device 73 highlights VIDEO 1 in the left column.

It is now assumed that a label D-VHS 1 is set for the digital signal DD1 from the recording/reproducing device 200 and a label D-VHS 2 is set for the digital signal DD2 from the recording/reproducing device 300.

FIGS. 9 and 10 are diagrams showing an example of screen displays that appear when determining the correspondence between the connected apparatuses and the reproduction signals. After determining the target of setting, the viewer determines the correspondence between the apparatuses connected to the analog terminals and the reproduction signals inputted from those apparatuses. For example, when the recording/reproducing device 200 connected to the analog terminal AP1 is selected as the target of setting, VIDEO 1 in the right column is highlighted as shown in FIG. 8 to determine the correspondence between the apparatus and the reproduction signal. The viewer then operates the connection information setting unit 50 to vary the display VIDEO 1 in the right column to set the correspondence between the apparatus connected to the analog terminal AP1 and the reproduction signal inputted from that apparatus. FIG. 9 shows the screen display of the video display device 73 in which the recording/reproducing device 200 connected to the analog terminal AP1 and the digital signal DD1 labeled as D-VHS 1 are associated with each other.

In this case, the monitor device 100 and the connection information setting unit 50 operate as shown below.

The apparatuses connected to the monitor device 100 through the digital terminals send their own identification signals to the monitor device 100.

With the apparatus connection setting screen shown in FIG. 8, the input check device 20 checks the signal r2 showing the contents of the information attached to the digital signals that are inputted to the digital switch device SW2.

Then, with the signal r2, the input check device 20 recognizes that VIDEO 1 in the left column can be associated with D-VHS 1 or D-VHS 2. Then as the viewer operates the connection information setting unit 50, the input check device 20 outputs a signal to the OSD circuit 60 to display D-VHS 1 or D-VHS 2.

Suppose that the viewer checks the apparatus connection setting screen and operates the connection information setting unit 50 to send to the input check device 20 a signal indicating that the digital signal DD1 labeled as D-VHS 1 is associated with VIDEO 1 in the left column. The input check device 20 then outputs a signal to the OSD circuit 60 to display D-VHS 1, as mentioned above. Then, in the connection setting screen, as shown in FIG. 9, VIDEO 1 in the left column and the corresponding D-VHS 1 in the right column are highlighted.

In the process above, it is not essential that the information about the apparatus connection be set on the basis of the apparatus connection setting screen displayed in the video display device 73; a display device capable of displaying the apparatus connection setting screen may be provided in the connection information setting unit 50, or a switch device may be provided for setting the apparatus connection information on the basis of the apparatus connection setting screen.

After the operation above, the input check device 20 generates the connected apparatus table on the basis of the contents determined by the viewer on the screen and outputs it to the storage 40. The storage 40 then stores the connected apparatus table. The correspondence between the connected apparatus VIDEO 1 and its reproduction signals has thus been set.

Next, in FIG. 10, the viewer associates VIDEO 2 in the left column and the digital signal DD2 labeled as D-VHS 2. In this case, the correspondence between the apparatus and its reproduction signal is set in the same way as the correspondence between VIDEO 1 and D-VHS 1. VIDEO 1 and VIDEO 2 in the left column are thus set and the connected apparatus table shown in FIG. 6 is generated.

In this way, the input check device 20 knows from the connection apparatus table of FIG. 6 that the analog signal AD1 to the analog terminal AP1 displayed as VIDEO 1 is associated with the digital signal DD1 labeled as D-VHS 1 and that the analog signal AD2 to the analog terminal AP2 displayed as VIDEO 2 is associated with the digital signal DD2 labeled as D-VHS 2. While the correspondence is usually established between an analog signal from an apparatus connected to an analog terminal and a digital signal from the same apparatus, an analog signal from an apparatus connected to an analog terminal may be associated with a digital signal from another connected apparatus.

For example, when one apparatus is connected only to an analog terminal of the monitor device 100 and another apparatus is connected only to a digital terminal of the monitor device 100, the analog signal from the apparatus connected to the analog terminal may be associated with the digital signal from the other connected apparatus. In this case, the monitor device 100 regards the one and the other apparatus as the same apparatus.

A connection information setting program of the present invention is now described.

The connection information setting program of this embodiment is stored in the storage 40. The input check device 20 operates on the basis of the connection information setting program.

Figure 11:
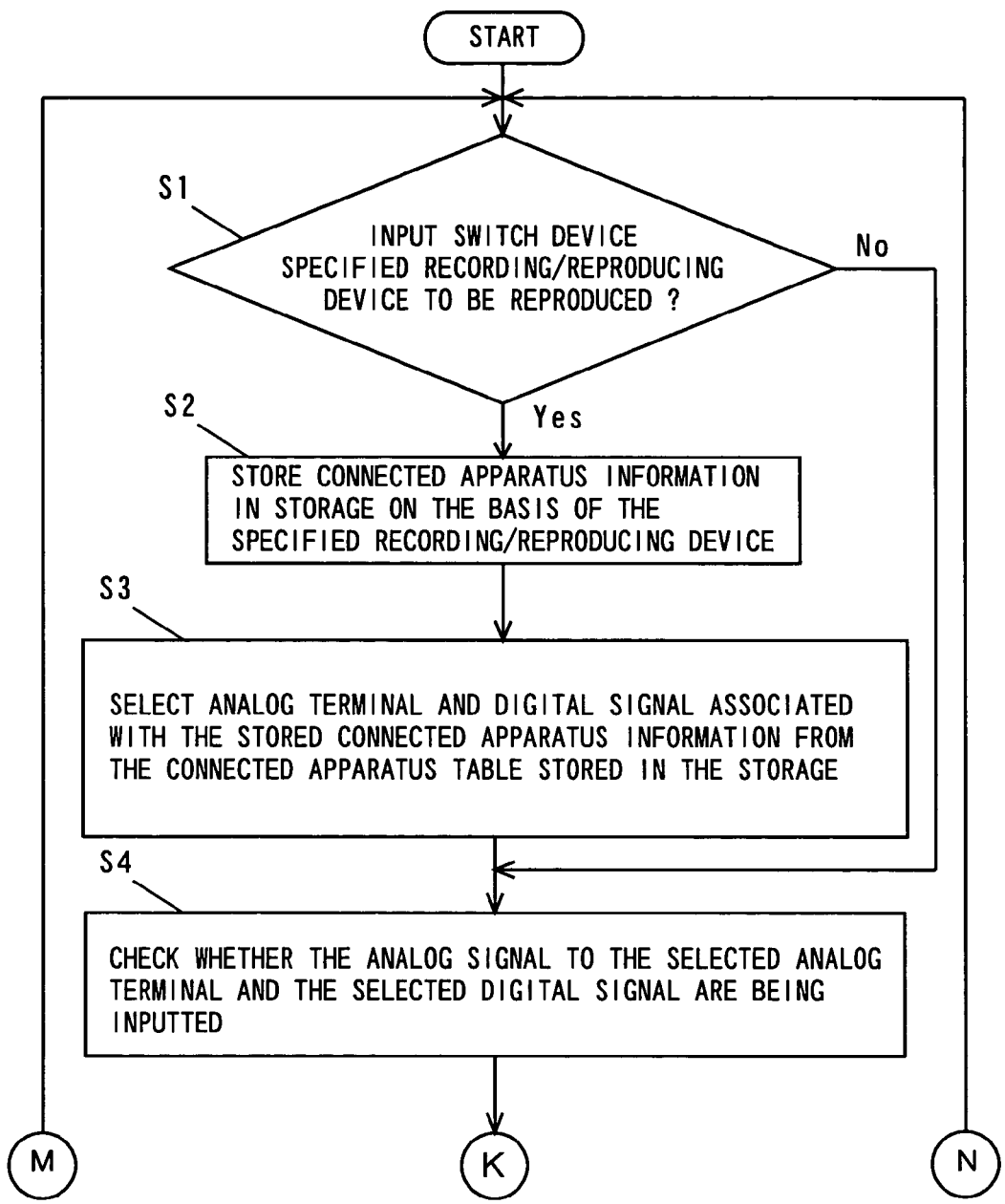
FIG. 11 is a flowchart showing operation of the input check device.
Figure 12:
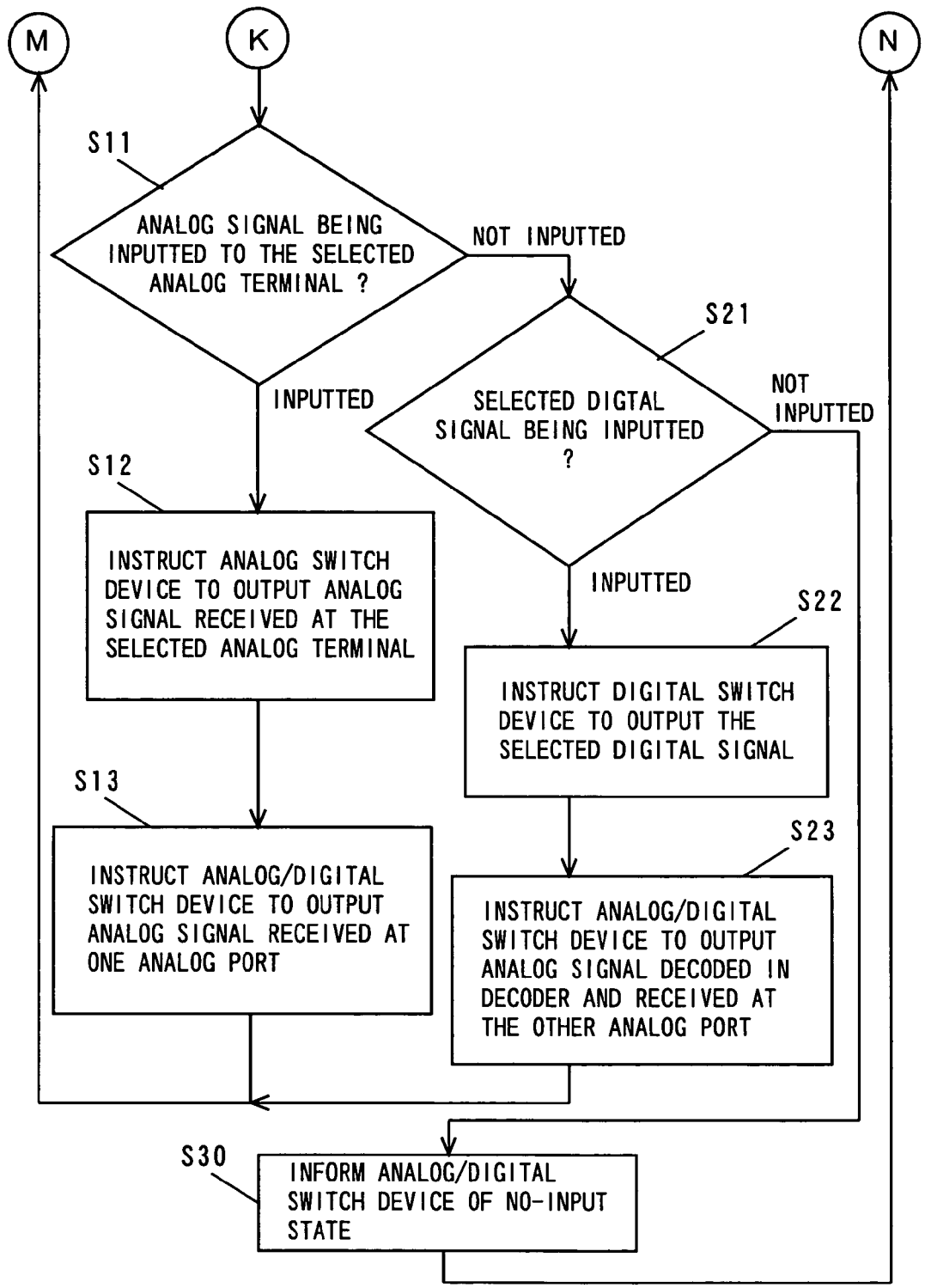
FIG. 12 is a flowchart showing operation of the input check device.

Now the operation of the input check device 20 with the connection information setting program is described referring to FIGS. 11 and 12.

FIGS. 11 and 12 form a flowchart showing the operation of the input check device 20.

First, the input check device 20 checks whether the input switch device 10 has specified a recording/reproducing device to be reproduced (Step S1).

When the input switch device 10 has specified a recording/reproducing device to be reproduced, the input check device 20 stores in the storage 40 the connected apparatus information on the basis of the specified recording/reproducing device (Step S2) and selects the analog terminal and the digital signal corresponding to the stored connected apparatus information on the basis of the connected apparatus table stored in the storage 40 (Step S3).

When the input switch device 10 does not specify a recording/reproducing device to be reproduced, the input check device 20 performs Step S4 shown below.

After the operation above, the input check device 20 checks the input for the analog signal to the selected analog terminal and the selected digital signal (Step S4). When no recording/reproducing device is specified by the input switch device 10 as the target of reproduction, it checks the input for an analog signal to a preselected analog terminal and a preselected digital signal.

The input check device 20 checks whether the input of the analog signal to the selected analog terminal is present (Step S11).

When the input of the analog signal to the selected analog terminal is present, the input check device 20 instructs the analog switch device SW1 to output the analog signal received at the selected analog terminal (Step S12) and instructs the analog/digital switch device SW3 to output the analog signal received at one analog port AP3 (Step S13). Then the input check device 20 repeats Step S1.

On the other hand, when the input of the analog signal to the selected analog terminal is absent, the input check device 20 checks whether the input of the selected digital signal is present (Step S21).

When the input of the selected digital signal is present, the input check device 20 instructs the digital switch device SW2 to output the selected digital signal (Step S22) and instructs the analog/digital switch device SW3 to output the analog signal decoded in the decoder and received at the other analog port DP3 (Step S23). Then the input check device 20 repeats Step S1.

When the input of the selected digital signal is absent, the input check device 20 informs the analog/digital switch device SW3 of no-input state (Step S30). Then the input check device 20 repeats Step S1.

In the connection information setting program shown above, Steps S21 to S23 for checking the input for the digital signal may be performed prior to Steps S11 to S13 for checking the input for the analog signal to the analog terminal.

Figure 13:
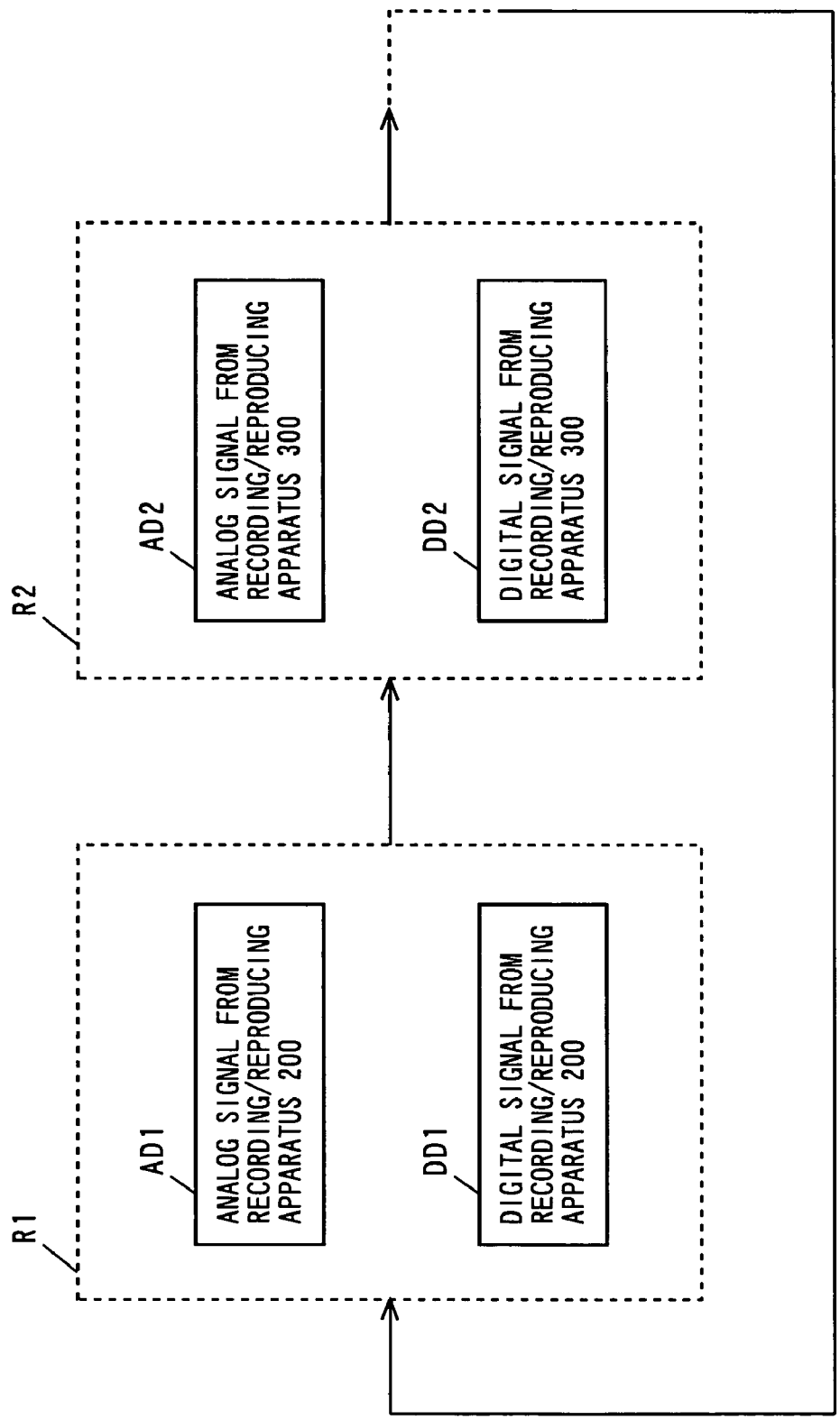
FIG. 13 is a schematic diagram showing the order in which the input reproduction signals are checked.

FIG. 13 is a schematic diagram showing the order in which the input reproduction signals are checked.

When the viewer sequentially switch the apparatus to be reproduced, the input check device 20 checks the reproduction signals as shown below.

When the viewer selects the recording/reproducing device 200 as the target of reproduction with the input switch device 10, the input check device 20 regards the connected apparatus information as R1 and performs Steps S11 to S13 and Steps S21 to S23 about the analog signal AD1 to the analog terminal AP1 and the digital signal DD1 from the recording/reproducing apparatus 200.

After that, when the viewer operates the input switch device 10 to specify the recording/reproducing device 300 as the target of reproduction, the input check device 20 regards the connected apparatus information as R2 and performs Steps S11 to S13 and Steps S21 to S23 about the analog signal AD2 and the digital signal DD2 from the recording/reproducing device 300.

As shown above, as the viewer operates the input switch device 10 to sequentially vary the target of reproduction, the input check device 20 performs Steps S11 to S13 and Steps S21 to S23 individually about the plurality of connected apparatuses. Thus the monitor device 100 can provide video display and audio output with the reproduction signals from the reproduced apparatuses whichever the signal format is.

Figure 14:
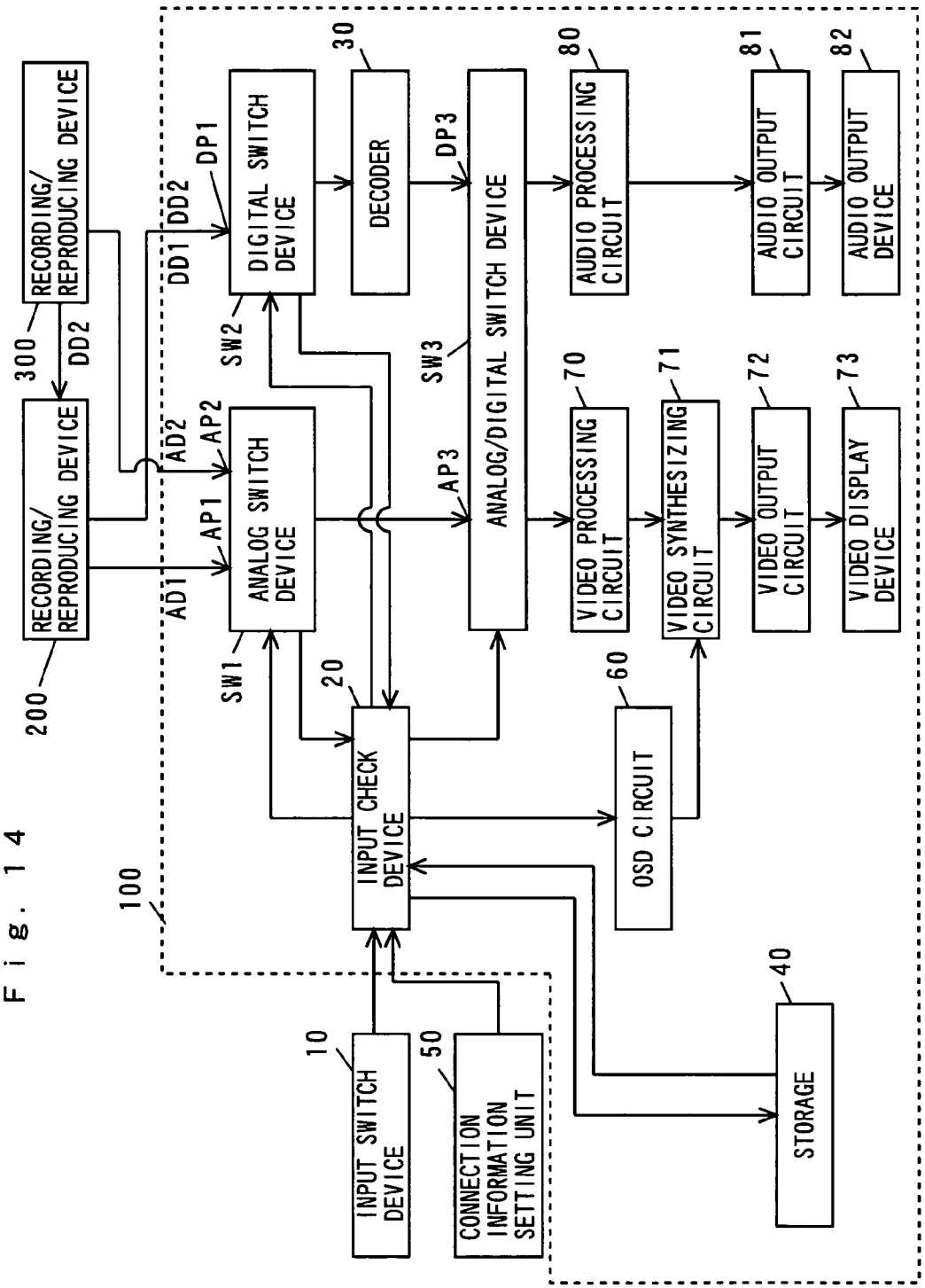
FIG. 14 is a block diagram showing another example of connection between the monitor device of FIG. 1 and a plurality of recording/reproducing devices.

FIG. 14 is a block diagram showing another example of connection between the monitor device of FIG. 1 and a plurality of recording/reproducing devices.

In this example, while the monitor device 100 is connected with the recording/reproducing device 200 and the recording/reproducing device 300, they are connected in a different manner from those of FIG. 1.

The recording/reproducing device 200 is connected to the monitor device 100 through a cable adapted for analog signal and a cable adapted for digital signal. That is to say, the recording/reproducing device 200 is directly connected to the analog terminal AP1 and the digital terminal DP1 of the monitor device 100 through the cables. On the other hand, the recording/reproducing device 300 is connected to the monitor device 100 through a cable adapted for analog signal and connected to the recording/reproducing device 200 through a cable adapted for digital signal. That is, the recording/reproducing device 300 is directly connected to the analog terminal AP2 of the monitor device 100 through the cable and connected to the digital terminal DP1 of the monitor device 100 through the recording/reproducing device 200.

In the example of connection shown in FIG. 14, a reproduction signal path from the recording/reproducing device 300 to the monitor device 100 differs from that of FIG. 1 in the following point.

With the devices connected as shown in FIG. 14, suppose that the digital signal DD2 is outputted as the reproduction signal from the recording/reproducing device 300. In this case, the digital signal DD2 is transferred to the recording/reproducing device 200 through the digital signal cable. Then, receiving the digital signal DD2, the recording/reproducing device 200 transfers the digital signal DD2 to the monitor device 100 through the digital signal cable connected to the digital terminal DP1 of the monitor device 100.

In this way, even though the recording/reproducing device 300 is not directly connected to the monitor device 100, the digital signal DD2 can be transferred from the recording/reproducing device 300 to the monitor device 100 because they are indirectly connected. Then the monitor device 100 checks the signal attached to the input digital signal and operates as described above.

Figure 15:
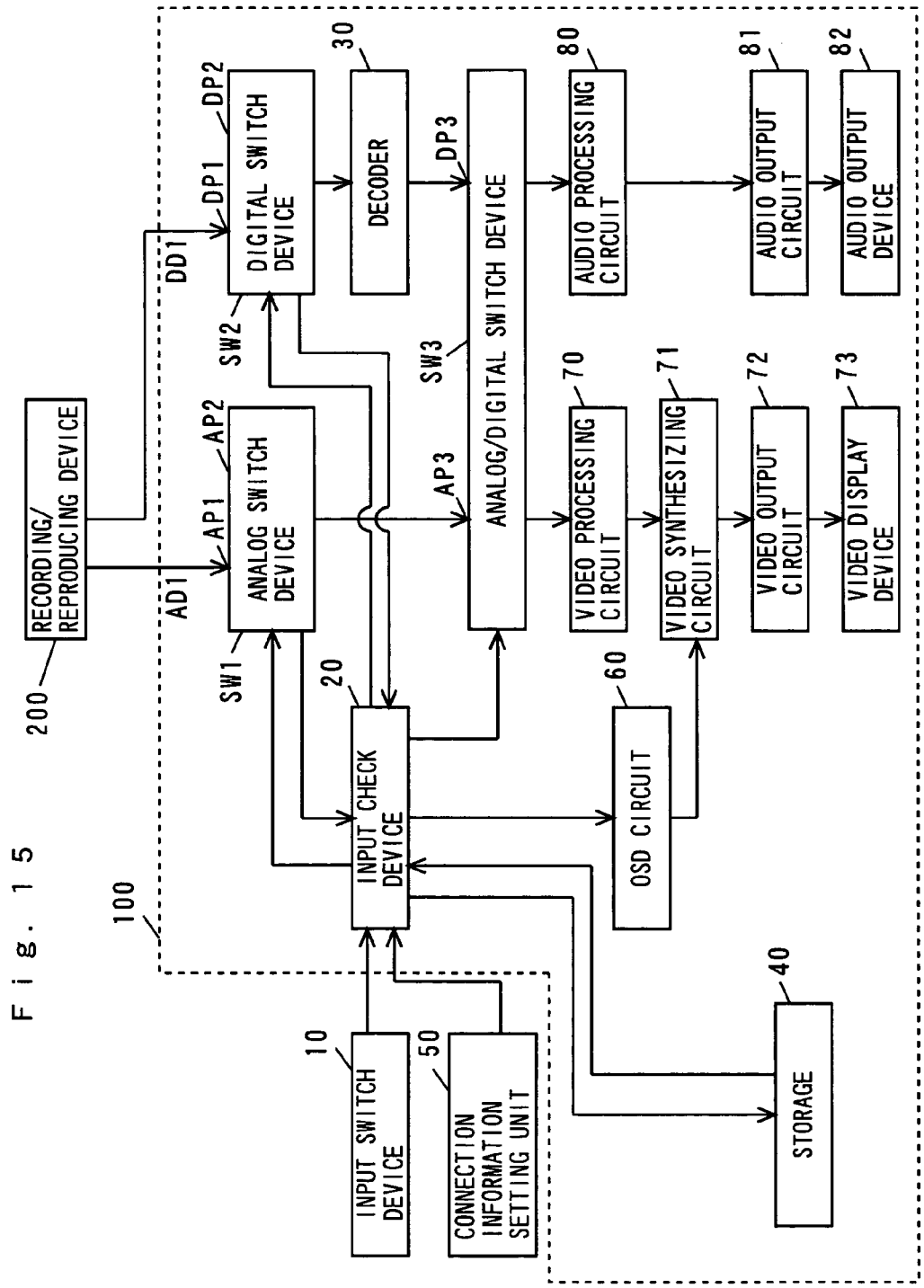
FIG. 15 is a block diagram showing an example of connection between the monitor device of FIG. 1 and one recording/reproducing device.

FIG. 15 is a block diagram showing an example of connection between the monitor device shown in FIG. 1 and one recording/reproducing device.

The recording/reproducing device 200 alone is connected to the monitor device 100. The recording/reproducing device 200 is connected to the monitor device 100 through a cable adapted for analog signal and a cable adapted for digital signal.

In the example shown in FIG. 15, too, the monitor device 100 operates in the above-described manner on the basis of the apparatus connection information set by the viewer and the designation of the reproduction target. That is to say, the viewer refers to the apparatus connection setting screen shown in FIG. 7 and sets the apparatus connection information about the recording/reproducing device 200, and the input check device 20 generates a connected apparatus table shown in FIG. 6 and stores it in the storage 40. After that, the viewer specifies the recording/reproducing device 200 as the target of reproduction and the input check device 20 executes the connection information setting program shown in FIGS. 11 and 12. Thus a reproduction signal from the recording/reproducing device 200, which has been recognized as the target of reproduction by the connection information setting program, is sent to the circuits in the video display system and the audio output system, on the basis of which video display and audio output are presented.

In this way, even when a single apparatus is connected to the monitor device 100, the monitor device 100 can provide video display and audio output with the reproduction signals from the connected apparatus whichever the signal format is, on the basis of the correspondence information between the connected apparatus and the reproduction signals set by the viewer and the designation of the target of reproduction.

In the embodiment above, the digital terminals of the monitor device 100 can be IEEE (Institute of Electrical and Electronic Engineers) 1394 terminals or USB (Universal Serial Bus) 2.0 terminals, for example. Also, the monitor device 100 may be provided with D terminals mentioned above or terminals based on S-VHS standards (Separate-Video Home System: a registered trademark of Victor Company of Japan, Limited).

Figure 16:
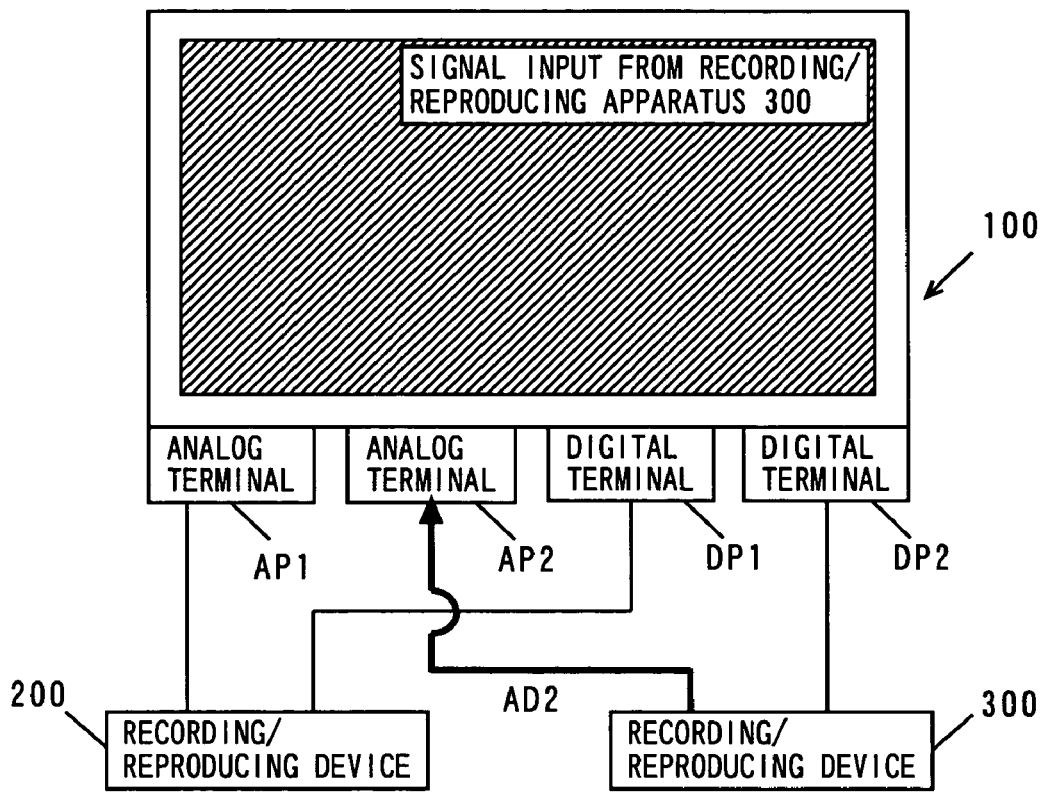
FIG. 16 is a schematic diagram showing an example of a screen display that appears when a reproduction signal is detected from a recording/reproducing device not selected, in the absence of reproduction signal from the selected recording/reproducing device.
Figure 17:
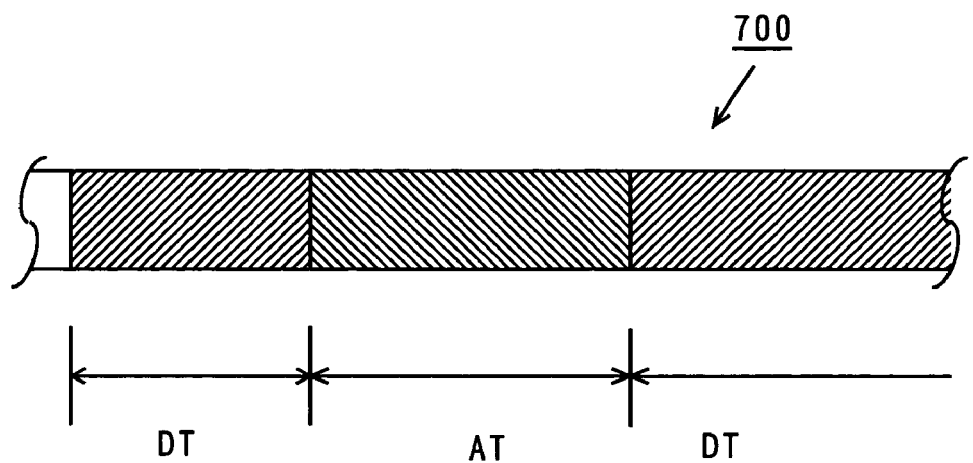
FIG. 17 is a schematic diagram showing part of videotape on which digital and analog signals are recorded.

When the monitor device 100 recognizes the input of a reproduction signal from a connected apparatus other than that specified as the reproduction target, with the target apparatus sending no reproduction signal, the monitor device 100 may display a screen image as shown in FIG. 16. In FIG. 16, the monitor device 100 is blacked out because of the absence of reproduction signal from the recording/reproducing device 200 as the target of reproduction, but it displays in part of the screen the information showing that a reproduction signal from the recording/reproducing device 300, another connected apparatus, is being inputted. This allows the viewer to recognize that another connected apparatus displayed is outputting a reproduction signal and then the viewer can operate the input switch device 10 on the basis of the information.

In the embodiment above, when a plurality of recording/reproducing devices are connected to the monitor device 100, the input check device 20 performs Steps S11 to S13 and Steps S21 to S23 about one target apparatus; however, it may at the same time check whether the input of a reproduction signal from another connected apparatus is present. For example, in the condition shown in FIG. 4, the input check device 20 may check the signal r1 from the analog switch device SW1, or the signal attached to the digital signal from the digital switch device SW2, to see whether the input of a reproduction signal from another connected apparatus is present, with no reproduction signal sent from the reproduction target apparatus. In this case, when the input of a reproduction signal from another connected apparatus not specified as the target of reproduction is present, that reproduction signal may be outputted to the video display system and the audio output system to provide video display and audio output.

In the embodiment above, when a plurality of apparatuses are connected to the monitor device 100, the input check device generates the connected apparatus table and checks the reproduction signals from the target of reproduction by referring to that table. In this embodiment, the connected apparatus table shows only the correspondence between the reproduction signals, i.e. the correspondence between the analog signals inputted to the analog terminals and the digital signals; however, the connected apparatus table may be used to set other information than the correspondence between the analog and digital reproduction signals.

For example, when the monitor device 100 has terminals of plural formats, e.g. the D terminals or the terminals based on S-VHS standards, then the connection apparatus table may be used to associate the digital reproduction signals and reproduction signals based on the color-difference signals inputted from the D terminals, or to associate the digital reproduction signals and reproduction signals inputted from the terminals adapted for S-VHS standards. Then the viewer can easily switch many reproduction signals.

In this embodiment, the recording/reproducing devices 200 and 300 correspond to the one or plurality of apparatuses, the connection information setting unit 50 corresponds to the combination setting means, the input switch device 10 corresponds to the apparatus selecting means, and the video display device 73 corresponds to the display means. The input check device 20, analog switch device SW1, digital switch device SW2, and analog/digital switch device SW3 form the reproduction signal selecting means, and the input check device 20 corresponds to the combination obtaining means, input check means, and control means. Also, in this embodiment, the analog terminals AP1 and AP2 correspond to the first terminals and the digital terminals DP1 and DP2 correspond to the second terminal, the decoder 30 corresponds to the decoding means, the input switch device 10 corresponds to the apparatus selecting means, the connection information setting unit 50 corresponds to the input means, and the input check device 20, storage 40, and OSD circuit 60 correspond to the identification information setting means.

In this embodiment, the connection information setting unit 50 corresponds to the combination setting device; the input check device 20, analog switch device SW1, digital switch device SW2, and analog/digital switch device SW3 form the reproduction signal selecting device; the video display device 73 corresponds to the display device; the input check device 20 corresponds to the combination obtaining device, input check device and control device; the input switch device 10 corresponds to the apparatus selecting device; and the connection information setting unit 50 corresponds to the input device.

According to the present invention, the monitor device can recognize reproduction signals from the same apparatus as a combination, so that even when a reproduction signal from the apparatus selected by the user has changed to another reproduction signal from the same apparatus, the new reproduction signal can be automatically displayed. Thus the user can easily obtain video display based on reproduction signals from a desired apparatus just by causing the monitor device to recognize one apparatus as the target of reproduction, without the need to instruct the monitor device to display a particular reproduction signal.

The invention claimed is:

1. A monitor device to which one or a plurality of apparatuses can be connected, comprising:
    a reproduction signal selecting device that selects one reproduction signal from one or a plurality of reproduction signals from a same apparatus on the basis of a combination set by said combination setting device;
    a display device that displays the reproduction signal selected by said reproduction signal selecting device;
    an apparatus selecting device that selects one of said one or plurality of apparatuses;
    a combination obtaining device that obtains, from said combination setting device, a combination corresponding to the apparatus selected by said apparatus selecting device;

an input check device that checks to distinguish a reproduction signal inputted from among the one or plurality of reproduction signals from said one or plurality of apparatuses; and a control device that controls said reproduction signal selecting device so that, among the one or plurality of reproduction signals from the apparatus selected by said apparatus selecting device, said reproduction signal selecting device outputs to said display device the reproduction signal distinguished by said input check device, on the basis of the combination obtained by said combination obtaining device, wherein the monitor device receives instructions from a combination setting device that groups the one or plurality of reproduction signals from said one or plurality of apparatuses to set a combination or combinations each comprising the one or plurality of reproduction signals from the same apparatus, and wherein, from among the one or plurality of reproduction signals from the apparatus selected by said apparatus selecting device, said reproduction signal selecting device selects one reproduction signal on the basis of the combination set by said combination setting device, wherein said plurality of reproduction signals of different signal formats include an analog signal and a digital signal, and wherein when said input check device judges that the reproduction signal being inputted has changed to another reproduction signal, said control device checks the combination obtained by said combination obtaining device to see whether said another reproduction signal is sent from the apparatus selected by said apparatus selecting device, and when said another reproduction signal is not from the apparatus selected by said apparatus selecting device, said control device controls said reproduction signal selecting device so that said reproduction signal selecting device does not output to said display device the reproduction signal being inputted.

2. The monitor device according to claim 1, wherein said input check device distinguishes the reproduction signal being inputted on the basis of an identification signal contained in the digital signal.

3. The monitor device according to claim 1, further comprising:

a plurality of first terminals that receives a plurality of analog signals; and at least one second terminal that receives a plurality of digital signals;

wherein said combination setting device comprises:

an input device that enters combinations each comprising one of the analog signals received at said plurality of first terminals and one of the plurality of digital signals received at said at least one second terminal; and a storage device that stores the combinations entered by said input device.

4. The monitor device according to claim 1, further comprising a decoding device that decodes the digital signals received at said at least one second terminal, wherein said reproduction signal selecting device selects an analog signal inputted to one of said plurality of first terminals or a digital signal decoded by said decoding device.

5. The monitor device according to claim 1, further comprising an identification information setting device that sets, in said plurality of reproduction signals from said one or plurality of apparatuses, identification information for identifying the plurality of reproduction signals, wherein said combination setting device sets each combination of reproduction signals from the same apparatus using the identification information set by said identification information setting device.

6. The monitor device according to claim 5, wherein said identification information setting device sets a character string as the identification information in each of said one or plurality of reproduction signals.

7. A monitor device to which one or a plurality of apparatuses can be connected, comprising:

a reproduction signal selecting device that selects one reproduction signal from one or a plurality of reproduction signals from a same apparatus on the basis of a combination set by said combination setting device;

a display device that displays the reproduction signal selected by said reproduction signal selecting device;

an apparatus selecting device that selects one of said one or plurality of apparatuses;

a combination obtaining device that obtains, from said combination setting device, a combination corresponding to the apparatus selected by said apparatus selecting device;

an input check device that checks to distinguish a reproduction signal inputted from among the one or plurality of reproduction signals from said one or plurality of apparatuses; and a control device that controls said reproduction signal selecting device so that, among the one or plurality of reproduction signals from the apparatus selected by said apparatus selecting device, said reproduction signal selecting device outputs to said display device the reproduction signal distinguished by said input check device, on the basis of the combination obtained by said combination obtaining device;

wherein the monitor device receives instructions from a combination setting device that groups the one or plurality of reproduction signals from said one or plurality of apparatuses to set a combination or combinations each comprising the one or plurality of reproduction signals from the same apparatus, and wherein, from among the one or plurality of reproduction signals from the apparatus selected by said apparatus selecting device, said reproduction signal selecting device selects one reproduction signal on the basis of the combination set by said combination setting device, wherein said plurality of reproduction signals of different signal formats include an analog signal and a digital signal, and wherein when said input check device judges that the reproduction signal being inputted has changed to another reproduction signal, said control device checks the combination obtained by said combination obtaining device to see whether said another reproduction signal is sent from the apparatus selected by said apparatus selecting device, and when said another reproduction signal is not from the apparatus selected by said apparatus selecting device, said control device controls said reproduction signal selecting device so that said reproduction signal selecting device does not output to said display device the reproduction signal being inputted, and said control device also causes said display device to display information indicating the reproduction signal being inputted.

8. The monitor device according to claim 7, wherein said input check device distinguishes the reproduction signal being inputted on the basis of an identification signal contained in the digital signal.

9. The monitor device according to claim 7, further comprising:
- a plurality of first terminals that receives a plurality of analog signals; and
- at least one second terminal that receives a plurality of digital signals;
- wherein said combination setting device comprises:
- an input device that enters combinations each comprising one of the analog signals received at said plurality of first terminals and one of the plurality of digital signals received at said at least one second terminal; and
- a storage device that stores the combinations entered by said input device.

10. The monitor device according to claim 7, further comprising a decoding device that decodes the digital signals received at said at least one second terminal,
- wherein said reproduction signal selecting device selects an analog signal inputted to one of said plurality of first terminals or a digital signal decoded by said decoding device.

11. The monitor device according to claim 7, further comprising an identification information setting device that sets, in said plurality of reproduction signals from said one or plurality of apparatuses, identification information for identifying the plurality of reproduction signals,
- wherein said combination setting device sets each combination of reproduction signals from the same apparatus using the identification information set by said identification information setting device.

12. A monitor device to which one or a plurality of apparatuses can be connected, comprising:
- a reproduction signal selecting device that selects one reproduction signal from one or a plurality of reproduction signals from a same apparatus on the basis of a combination set by said combination setting device;
- a display device that displays the reproduction signal selected by said reproduction signal selecting device;
- an apparatus selecting device that selects one of said one or plurality of apparatuses;
- a combination obtaining device that obtains, from said combination setting device, a combination corresponding to the apparatus selected by said apparatus selecting device;
- an input check device that checks to distinguish a reproduction signal inputted from among the one or plurality of reproduction signals from said one or plurality of apparatuses; and
- a control device that controls said reproduction signal selecting device so that, among the one or plurality of reproduction signals from the apparatus selected by said apparatus selecting device, said reproduction signal selecting device outputs to said display device the reproduction signal distinguished by said input check device, on the basis of the combination obtained by said combination obtaining device,
- wherein the monitor device receives instructions from a combination setting device that groups the one or plurality of reproduction signals from said one or plurality of apparatuses to set a combination or combinations each comprising the one or plurality of reproduction signals from the same apparatus,
- and wherein, from among the one or plurality of reproduction signals from the apparatus selected by said apparatus selecting device, said reproduction signal selecting device selects one reproduction signal on the basis of the combination set by said combination setting device,
- wherein said plurality of reproduction signals of different signal formats include an analog signal and a digital signal, and
- wherein when said input check device judges that the reproduction signal being inputted has changed to another reproduction signal, said control device checks the combination obtained by said combination obtaining device to see whether said another reproduction signal is sent from the apparatus selected by said apparatus selecting device, and when said another reproduction signal is not from the apparatus selected by said apparatus selecting device, said control device controls said reproduction signal selecting device so that said reproduction signal selecting device outputs to said display device the reproduction signal being inputted.

13. The monitor device according to claim 12, wherein said input check device distinguishes the reproduction signal being inputted on the basis of an identification signal contained in the digital signal.

14. The monitor device according to claim 12, further comprising:
- a plurality of first terminals that receives a plurality of analog signals; and
- at least one second terminal that receives a plurality of digital signals;
- wherein said combination setting device comprises:
- an input device that enters combinations each comprising one of the analog signals received at said plurality of first terminals and one of the plurality of digital signals received at said at least one second terminal; and
- a storage device that stores the combinations entered by said input device.

15. The monitor device according to claim 12, further comprising a decoding device that decodes the digital signals received at said at least one second terminal,
- wherein said reproduction signal selecting device selects an analog signal inputted to one of said plurality of first terminals or a digital signal decoded by said decoding device.

16. The monitor device according to claim 12, further comprising an identification information setting device that sets, in said plurality of reproduction signals from said one or plurality of apparatuses, identification information for identifying the plurality of reproduction signals,
- wherein said combination setting device sets each combination of reproduction signals from the same apparatus using the identification information set by said identification information setting device.

* * * * *

UNITED STATES PATENT AND TRADEMARK OFFICE
CERTIFICATE OF CORRECTION

PATENT NO. : 7,421,191 B2 Page 1 of 1
APPLICATION NO. : 10/250672
DATED : September 2, 2008
INVENTOR(S) : Seiichiro Umemoto et al.

It is certified that error appears in the above-identified patent and that said Letters Patent is hereby corrected as shown below:

On the cover page of the printed patent, in item (30) the Foreign Applications Priority Data, should read --"January 17, 2001 (JP) 2001-008486--

On the cover of the printed patent, at Item (54), and col. 1, line 1, Titled should read --MONITOR DEVICE, CONNECTION INFORMATION SETTING DEVICE, CONNECTION INFORMATION SETTING METHOD, AND CONNECTION INFORMATION SETTING PROGRAM.--

Signed and Sealed this

Twenty-third Day of December, 2008

JON W. DUDAS
*Director of the United States Patent and Trademark Office*